United States Patent [19]

Ozeki et al.

[11] Patent Number: 4,833,535

[45] Date of Patent: May 23, 1989

[54] IMAGE TRANSMISSION APPARATUS

[75] Inventors: Kazuo Ozeki, Tokyo; Fumio Sugiyama, Sagamihara; Kenshi Dachiku; Hisao Fujiwara, both of Tokyo; Toshiaki Watanabe, Kawasaki, all of Japan

[73] Assignee: Kabushiki Kaisha Toshiba, Kawasaki, Japan

[21] Appl. No.: 152,413

[22] Filed: Feb. 4, 1988

[30] Foreign Application Priority Data

| Feb. 4, 1987 | [JP] | Japan | 62-22398 |
| Feb. 12, 1987 | [JP] | Japan | 62-30281 |
| Mar. 12, 1987 | [JP] | Japan | 62-55354 |
| Mar. 25, 1987 | [JP] | Japan | 62-69016 |
| Jun. 8, 1987 | [JP] | Japan | 62-141433 |

[51] Int. Cl.$^4$ .................... H04N 7/133; H04N 7/137
[52] U.S. Cl. .................... 358/135; 358/133; 358/136; 358/138; 375/27; 375/33; 375/122
[58] Field of Search ........... 358/133, 135, 136, 138; 375/27, 33, 122

[56] References Cited

U.S. PATENT DOCUMENTS

| 4,302,775 | 11/1981 | Widergren | 358/136 |
| 4,385,363 | 5/1983 | Widergren et al. | 364/725 |
| 4,541,012 | 9/1985 | Tescher | 358/133 |
| 4,672,444 | 6/1987 | Bergen | 358/133 |
| 4,675,733 | 6/1987 | Tanimoto | 358/133 |
| 4,706,260 | 11/1987 | Fedele | 358/133 |

FOREIGN PATENT DOCUMENTS 60-154752 8/1985 Japan.

OTHER PUBLICATIONS

National Convention Record, 1987, The Institute of Electronics, Information and Communication Engineers, Part 5, K. Dachika, T. Watanabe and F. Sugiyama.

National Convention Record, 1987, The Institute of Electronics, Information and Communication Engineers, Part 5, T. Watanabe et al.

"Cosine Transform Circuit" 1987, National Convention Record of ITEJ 6-14.

Primary Examiner—Howard W. Britton
Attorney, Agent, or Firm—Oblon, Fisher, Spivak, McClelland & Maier

[57] ABSTRACT

An input image signal is divided into blocks each of 8 x 8 pixels, is subjected to cosine transform and is then converted to a signal of a spatial frequency region. After the cosine transform, the data is subjected to subtraction with respect to first to fourth types of data. Data of the same block of the one previous frame is used as the first data to provide a first difference between frames. Data of different blocks in the same frame is used as the second data to provide a second difference within the same frame. The third data is background image data and the fourth data is specific data. The minimum one of the first to fourth difference data is selected, and is then quantized and transmitted. Accordingly, a difference data involving a small amount of information to be transmitted can be selected for each block, thus always realizing a high transmission efficiency irrespective of the degree of image change.

22 Claims, 17 Drawing Sheets

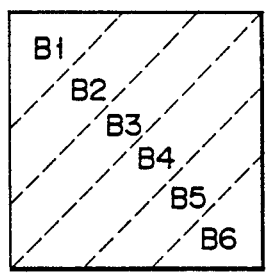
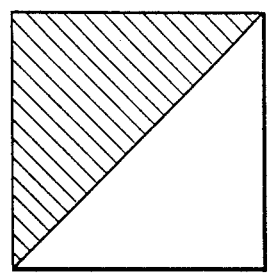
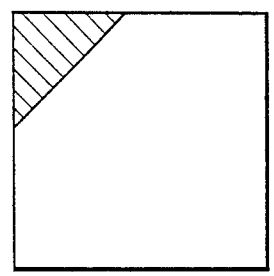
F I G. 10A        F I G. 10B        F I G. 10C
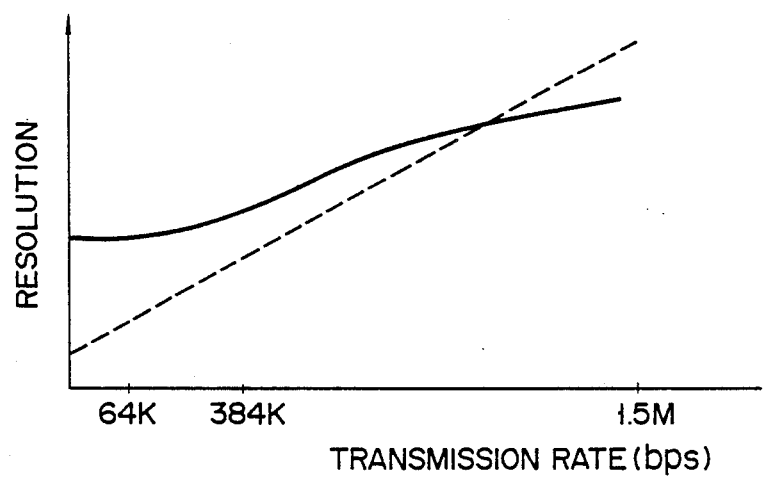
F I G. 11

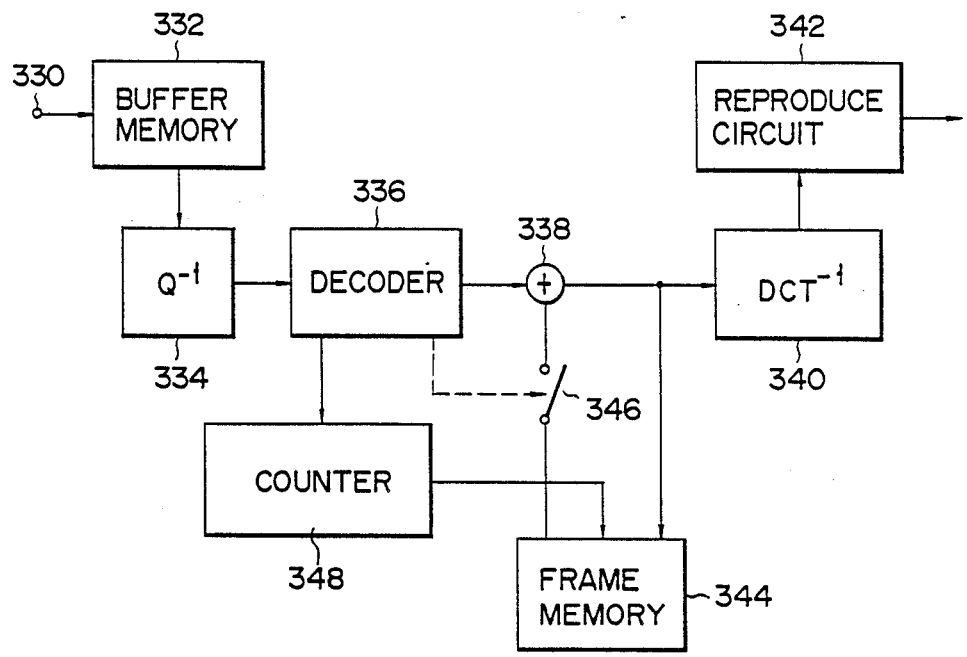
F I G. 17
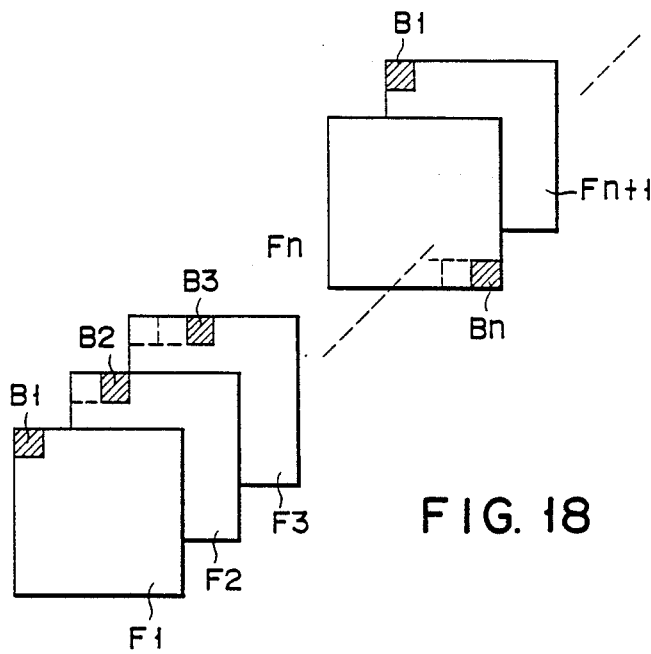
F I G. 18

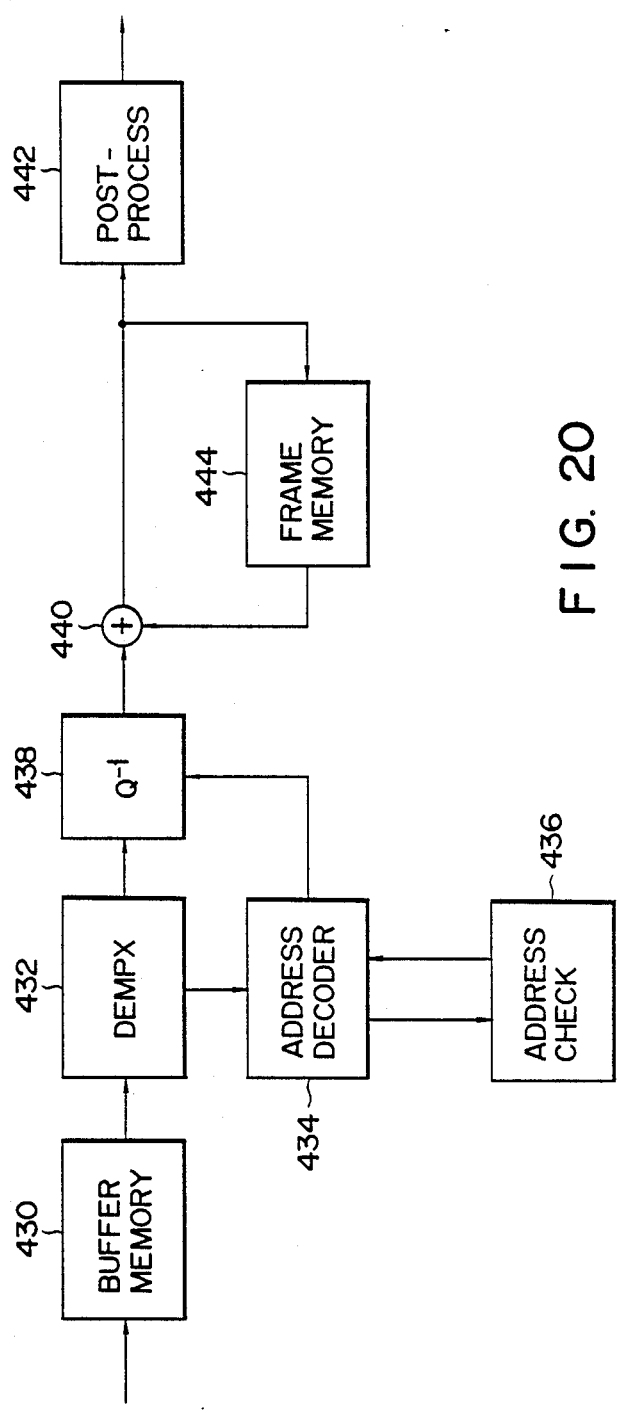
F I G. 20

| A(0,0) | A(0,1) | A(0,2) | | A(0,j) |
|---|---|---|---|---|
| A(1,0) | A(1,1) | A(1,2) | | |
| | | | | |
| A(i,0) | A(i,1) | A(i,2) | | A(i,j) |
| | | | | |

IMAGE TRANSMISSION APPARATUS

BACKGROUND OF THE INVENTION

The present invention relates to an image transmission apparatus which encodes an image signal and transmits it in real time over a transmission path (digital line).

As this type of image transmission apparatus, there is an image coding apparatus for use in a television (TV) telephone, a TV conference system or the like. An orthogonal transform differential coding apparatus is an example of this image coding apparatus, and this differential coding apparatus divides one field or one frame of TV signals into plural blocks of signals, subjects an image signal for each block to orthogonal transform, such as a cosine transform, acquires not image data after the transform as it is, but the difference between one field or one frame of transformed data and the previous field or frame of transformed data, and encodes the difference signal.

If the motion of an object on a frame is insignificant, the difference signal attained by such a differential coding apparatus becomes nearly zero, thus requiring a very small amount of codes to be transmitted. This is advantageous in signal transmission. If the object moves quickly, however, the amount of codes increases so that the use of the orthogonal transform circuit with a complicated circuit structure does not improve the coding efficiency so much.

Although there are various transmission rates for a digital line for transmitting such image signals, the conventional coding apparatuses are restricted to a specific one of the transmission rates for a target transmission line, or, even if the apparatuses designed to cope with a certain range of transmission rates, the range would be undesirably narrow.

This is because coding apparatuses should satisfy contradictory requirements in accordance with the line's transmission rates. For instance, in a coding apparatus designed for a low transmission rate, the processing (coding) speed can be slow but the coding efficiency (the ratio of the number of bits of a code to the number of bits of an original signal) should be high. For the one designed for a high transmission rate, on the other hand, the coding efficiency can be low, but the processing speed should be high.

Accordingly, the conventional apparatuses have their processing speeds and coding efficiencies determined on the basis of the transmission rates, and cannot therefore be coupled to those lines with different transmission rates. For instance, if a low transmission rate coding apparatus is coupled to a high transmission rate line, the coding speed cannot meet the line's transmission rate, which renders the apparatus inoperable. On the other hand, if a high transmission rate coding apparatus is coupled to a low transmission rate line, the image is significantly deteriorated due to the low coding efficiency.

Therefore, when a network is constructed by lines whose transmission rates vary between 64 Kbps and 1.5 Mbps, at least two coders/decoders for use for different transmission rates need to be at each communication site as shown is FIG. 1, increasing the installation cost and the installation space required.

To construct an image communication network which is studded with different types of coders/decoders as shown in FIG. 2, it is necessary to confirm the type of the coder/decoder at a destination prior to the image communication and this would complicate the coupling operation.

Further, matching between the coding speed and the decoding speed is important in constructing the image communication network. If the coding speed is higher than the decoding speed, a buffer memory, which is coupled between the coder/decoder assembly and the associated line to match the coding/decoding speed with the transmission rate, would overflow. On the contrary, with the decoding speed higher than the coding speed, the buffer memory would underflow. When such a phenomenon occurs, signals sequentially received would be interrupted and the signal transmission would be synchronous. As a result, information is likely to be lost or wrong decoding may be executed until the next synchronization time. In addition, with the use of a differential coding system, once wrong decoding is done, wrong signals will remain stored in the buffer memory unless the data in the buffer memory which is associated with the wrong decoding is rewritten by movement of an object.

Of those image transmission apparatuses which sequentially encode an image signal itself, not a so called difference signal that does not deteriorate an image quality so much even upon occurrence of loss of information, there is a type which allows for overflow and underflow of the buffer memory. In the TV conference system, however, the overflow and underflow of the buffer memory cannot be allowed for.

Japanese Patent Disclosure (Kokai) No. 60-154752 discloses a coding/decoding apparatus for television camera signals. According to this apparatus, when there is a small amount of transmission information (codes) on the sender side, insignificant information (dummy) is affixed to it and then sent so that the amount of data stored in the buffer memory on the receiver side becomes constant. This can prevent the occurrence of the possible overflow and underflow of the buffer memory on the receiver side.

However, affixing the dummy information to the codes prior to transmission inevitably results in a waste in information transmission and thus leads to inefficient information transmission.

In a differential coding (such as DPCM) apparatus, when some kind of error occurs in a transmitted code due to noise etc., this error would affect the decoding of the next difference signal (code) and errors would be accumulated in the decoder.

To prevent this phenomenon, conventionally error detection is executed on the receiver side, and upon detection of an error, a re-send request is sent to the sender. Then, the original PCM signal, not the DPCM signal, is sent from the sender to rewrite the content of the buffer memory on the receiver side.

However, this type of coding apparatus requires a device to detect the error the receiver side, and requires, on the sender side, a device to receive the re-send request and re-send the PCM signal associated with the transmission error and a buffer memory for temporary storage of the PCM signal to be resent.

Further, when a burst error occurs, the re-send request signal and the resent PCM signal alternately appear on the transmission line, thus reducing the capacitance of the transmission line assigned for transmission of the code data (DPCM signal).

In particular, since the orthogonal transform differential coding system involves block-by-block processes, even if an error occurs only in one of parameters of the converted data, it is necessary to resend the PCM signal associated with all the parameters of the block including the parameter in error (e.g., 8×8=64 parameters in the case of a two-dimensional 8th-order orthogonal transform). This system is significantly inefficient. Even if it is sufficient to resend only the PCM signal associated with the parameter in error, it is also necessary to send, at the same time, a signal indicating the location of the error parameter in its own block. This is a very inefficient system.

The difference coding system is used particularly in the case of a low transmission rate. Codes to be transmitted are often irregularly generated, and it is necessary to affix addresses to codes on the sender side, and align the irregularly-generated codes with data in the receiver's buffer memory and add them to the data using these addresses. If, in this case, an error occurs during transmission (i.e., transmission error) and any address is in error as a consequence, the proper address alignment cannot be done on the receiver side, causing the improper decoding. As incorrect data is accumulated in the receiver's buffer memory, adverse influence of the transmission error continues and significantly increases the deterioration of a reproduced image unless the transmitted codes are refreshed.

There have been methods known which use an error detection code or an error correction code in order to prevent the adverse influence of the transmission error. Because of the use of redundant codes for error detection and error correction, however, the codes become lengthy and the apparatus becomes complicated. In this respect, therefore, the methods for using such error detection and correction codes cannot be said to be effective in performing image transmission with high coding efficiency.

SUMMARY OF THE INVENTION

Therefore, it is an object of this invention to provide an image transmission apparatus which can apply to transmission lines of different transmission rates, and can transmit an image code without significant deterioration of the quality of the image, particularly when used in a low transmission rate mode.

It is another object of this invention to provide an image transmission apparatus which can always ensure a high coding efficiency, irrespective of the degree of change of an image (the level of the difference) in performing an orthogonal transform differential coding.

It is a further object of this invention to provide an image transmission apparatus in which a buffer memory on a decoding side does not overflow or underflow even when the coding speed does not coincide with the decoding speed, thus transmitting an image without loss of information or deterioration of the image quality.

It is still another object of this invention to provide an image transmission apparatus in a differential coding system, which can transmit an original code to refresh a buffer memory on a decoding side for compensation for a transmission error, without the need of additional unit to a transmitting/receiving section and without interrupting the transmission of a difference code.

It is a still further object of this invention to provide an image transmission apparatus in a differential coding system, which can detect a transmission error without the need of additional unit to a transmitting/ receiving section and without affixing an additional signal to a transmission signal.

An image transmission apparatus according to this invention comprises a subtractor for generating a first difference indicating a difference between an image signal of a present frame and an image signal of one previous frame, a second difference indicating a difference between an image signal of a given portion of the present frame and an image signal of another portion of the present frame, a third difference indicating a difference between an image signal of the present frame and an accumulated image signal of all previous frames, and a fourth difference signal indicating a difference between an image signal of the present frame and a predetermined image signal; and a quantizer, couple to the subtractor, for outputting a quantization signal of a minimum one of the first to fourth differences.

Another image transmission apparatus according to this invention comprises a sub-sampling circuit for reducing the number of pixels in a single frame of an image signal; a frame sampling circuit for reducing the number of frames of an image signal per unit time; a quantizer for quantizing an image signal put through the sub-sampling circuit and the frame sampling circuit; and a control circuit for controlling a sub-sampling interval of the sub-sampling circuit and a frame-reduction ratio of the frame sampling circuit in accordance with a transmission rate so as to reduce the number of pixels in the single frame and the number of frames of the image signal per unit time with reduction in the transmission rate, and the number of pixels is fixed and the number of frames is reduced when the transmission rate becomes lower than a predetermined rate.

BRIEF DESCRIPTION OF THE DRAWINGS

FIGS. 10A, 10B and 10C are diagrams showing examples of block selections performed at the time of quantization in the third embodiment;

FIG. 11 is a diagram showing a resolution with respect to transmission rates in the third embodiment;

FIG. 17 is a block diagram showing a receiver side of the fifth embodiment;

FIG. 18 is a diagram showing how a buffer memory on a decoding side is refreshed in the fifth embodiment;

FIG. 20 is a block diagram of a receiver side of the sixth embodiment;

DETAILED DESCRIPTION OF THE PREFERRED EMBODIMENT

Figure 1:
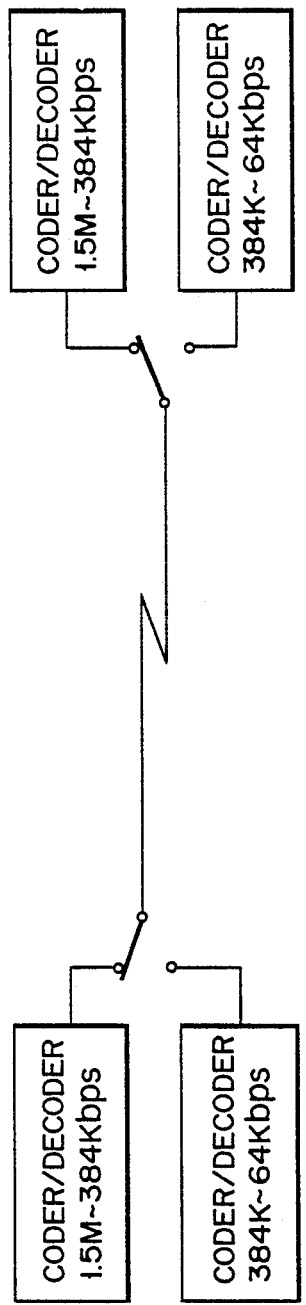
FIG. 1 is a diagram illustrating an example of a network constructed by a conventional image transmission apparatus.
Figure 2:
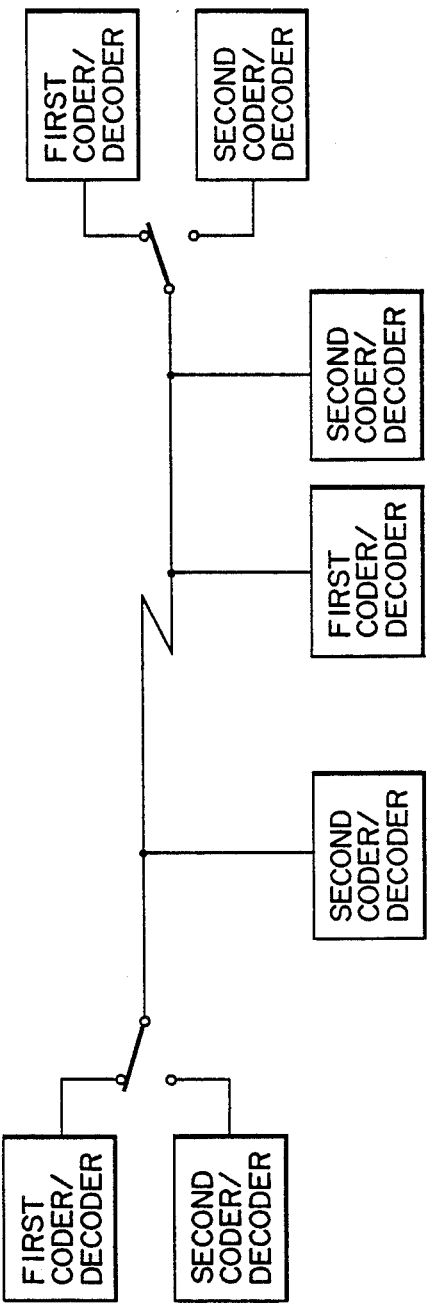
FIG. 2 is a diagram illustrating another example of a network constructed by a conventional image transmission apparatus.
Figure 3:
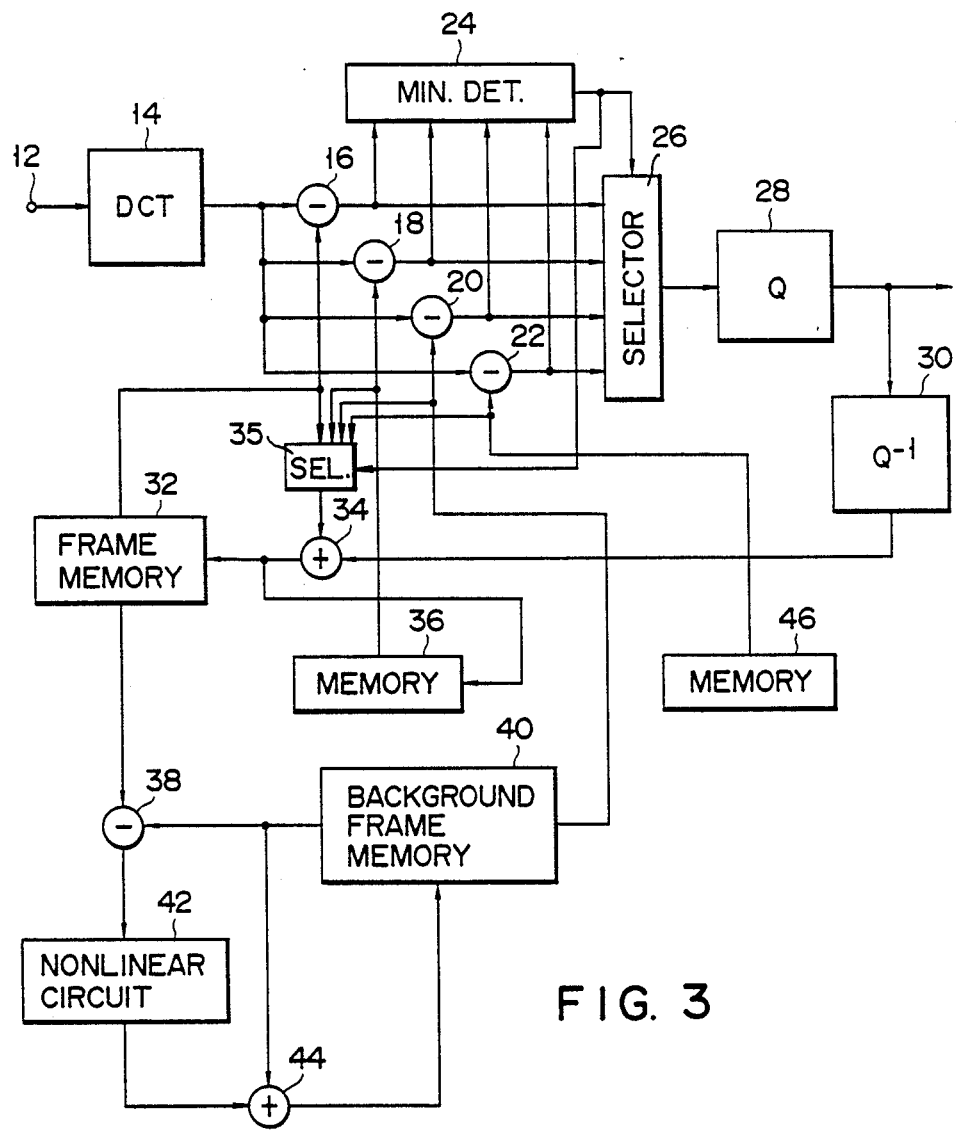
FIG. 3 is a block diagram of an image transmission apparatus according to a first embodiment of this invention.

An orthogonal transform differential coding circuit for use as an image transmission apparatus will no be explained as the first embodiment. FIG. 3 is a block diagram of the first embodiment. An image signal input via an input terminal 12 (here, image signals separated into blocks of 8 pixels by 8 pixels are input block by block) is subjected to a cosine transform in a two-dimensional, discrete cosine transform (DCT) circuit 14, so that the image signal is converted from a signal of a time region to a signal of a spatial frequency region. After the cosine transform, the data (hereinafter simply referred to as DCT data) is input to subtractors 16, 18, 20 and 22 to generate first to fourth differences between this DCT data and first to fourth (four types of) data, respectively.

The first to fourth difference data from subtractors 16, 18, 20 and 22 are supplied to a minimum detector 24 and also to a selector 26 where one of the difference data is selected. This minimum detector 24 compares the first to fourth difference data with one another for each block to detect the smallest one. To be specific, since $8 \times 8$ ($=64$) difference data are output from each subtractor for every block, minimum detector 24 calculates the total of 64 absolute values or the total of squares of the 64 difference data so as to detect the minimum value. Based on the output from minimum detector 24, selector 26 selects the minimum one of the first to fourth difference data. The output of selector 26 is quantized in a quantizer 28 and is transferred onto a transmission path. The quantization of the minimum one of the four difference data minimizes the amount of information to be transferred, and thus ensures the most effective data transmission.

The output of quantizer 28 is converted to difference data in an inverse quantizer 30 in order to produce four types of data (actually, three types of data) for attaining difference data. The output of inverse quantizer 30 is written into a frame memory 32 through an adder 34. The output of frame memory 32 is supplied to selector 35 as the first data. The second to fourth data (described later) are also supplied to selector 35. Selector 35 is controlled based on the output of minimum detector 24 in association with selector 26. The output of selector 35 is supplied to adder 34. In this manner, the image signal (converted data from DCT 14) of one previous frame, which has already been transferred, is written in frame memory 32. Of the image signals stored in frame memory 32, the data belonging to the same block as the image signal which is presently cosine-transformed is supplied as first data to subtractor 16 and selector 35.

The output of adder 34 is also written in a memory 36. This memory 36 stores data of a different block than the one which is presently cosine-transformed, for example, the different block being directly above (a corresponding block of the previous block scanning line) or the left block (the previous block in the same block scanning line), and supplies the stored data as the second data to subtractor 18 and selector 35. Memory 36 may be constituted by a shift register, not a frame memory.

The output of frame memory 32 is supplied to a subtractor 38 which generates the difference between that output and the output of a background frame memory 40. The difference is subjected to a nonlinear computation in a nonlinear circuit 42. The output of nonlinear circuit 42 and the output of background frame memory 40 are added together by an adder 44, and the resultant data is written in background frame memory 40.

Figure 4:
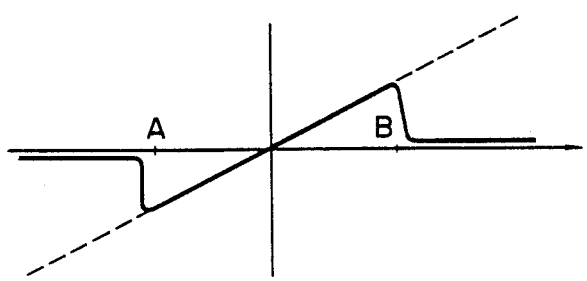
FIG. 4 is a diagram showing an input/output characteristic of nonlinear circuit used in the first embodiment shown in FIG. 3.

The input/output characteristic of nonlinear circuit 42 is illustrated in FIG. 4 in which the horizontal scale is the level of an input signal (difference signal) and the vertical scale is the level of an output signal. In the figure, the broken line indicates the case of a linear computation whereas the solid line indicates the case of a nonlinear computation. It is understood from FIG. 4 that when the input signal level (the difference between the output of frame memory 32 and the output of background frame memory 40) is small (between A and B), the output signal level increases in proportion to the input signal level, but when the input signal level is large (outside of the range A-B), the output signal level goes down significantly.

Therefore, when the image in frame memory 32 changes due to the movement of a person, etc. and the amount of the change (the output of subtractor 38) is small, the change is output as it is from nonlinear circuit 42 and is added through adder 44 to the content of background frame memory 40 to rewrite the memory content. On the other hand, when the change is large, it is reduced by nonlinear circuit 42. Consequently, such a large change is not immediately added to the content of background frame memory 40, the memory content being gradually rewritten. Therefore, if a person momentarily moves but soon returns to their original position, the content of background frame memory 40 will not be rewritten. That is, background frame memory 40 stores an image which has not been altered for a long period of time or a background image. The output of background frame memory 40 is supplied as the third data to subtractor 20 and selector 35.

Data with a given level is used as the fourth data irrespective of the output of inverse quantizer 30, and is stored in memory 46. The output of memory 46 is supplied to subtractor 22 and selector 35.

As should be understood from the above, according to the first embodiment, at the time the difference between an image signal and a give signal is quantized, it is possible to select, for each block, the system for providing the smallest one of the four differences, namely, (1) the difference between data in the same block of all the previously accumulated frames (the difference between frames), (2) the difference between data in different blocks of the same frame (the difference within a frame), (3) the difference between an object image and the background image and (4) the difference between an object image with specific data. In other words, the system for providing the smallest amount of information to be transferred can be selected for each block, thus always realizing a high transmission efficiency irrespective of the degree of image change.

For instance, when one part of an image causes a reciprocative change, the difference between the image and the background image is significantly small, thus improving the transmission efficiency is more effective than what is attained by the difference between frames. When a scene is changed, the difference between the image data and the specific data is probably minimum so that the rising speed is improved.

Since memories 32, 36, 40, and 46 store data after orthogonal transform, they require a smaller memory capacity for such data than for data of a time region. When the average value or the intermediate level of all images is used as the specific data, all the orthogonal-transformed data becomes zero excluding one component (direct current component), thus eliminating the need for a special memory 46. Even if the same specific pattern data is not used entirely, the orthogonally-transformed data often concentrates in a low frequency component, so that the amount of data can be significantly reduced as compared with the case where data of a time region is stored as fourth data.

With regard to the above four types of orthogonally-transformed data, the one used for the same position as in the previous frames corresponds to a still image or a semi-still image, the one used for a different position in the same frame corresponds to a background subjected to a time-integral when there is a repetitive pattern, the one used for the background corresponds to a reciprocal movement, and the one involving the specific data corresponds to a scene change or a large movement. Therefore, this system is particularly effective when the patterns of movement on the screen are restricted as in the case of a TV conference, for example.

Figure 5:
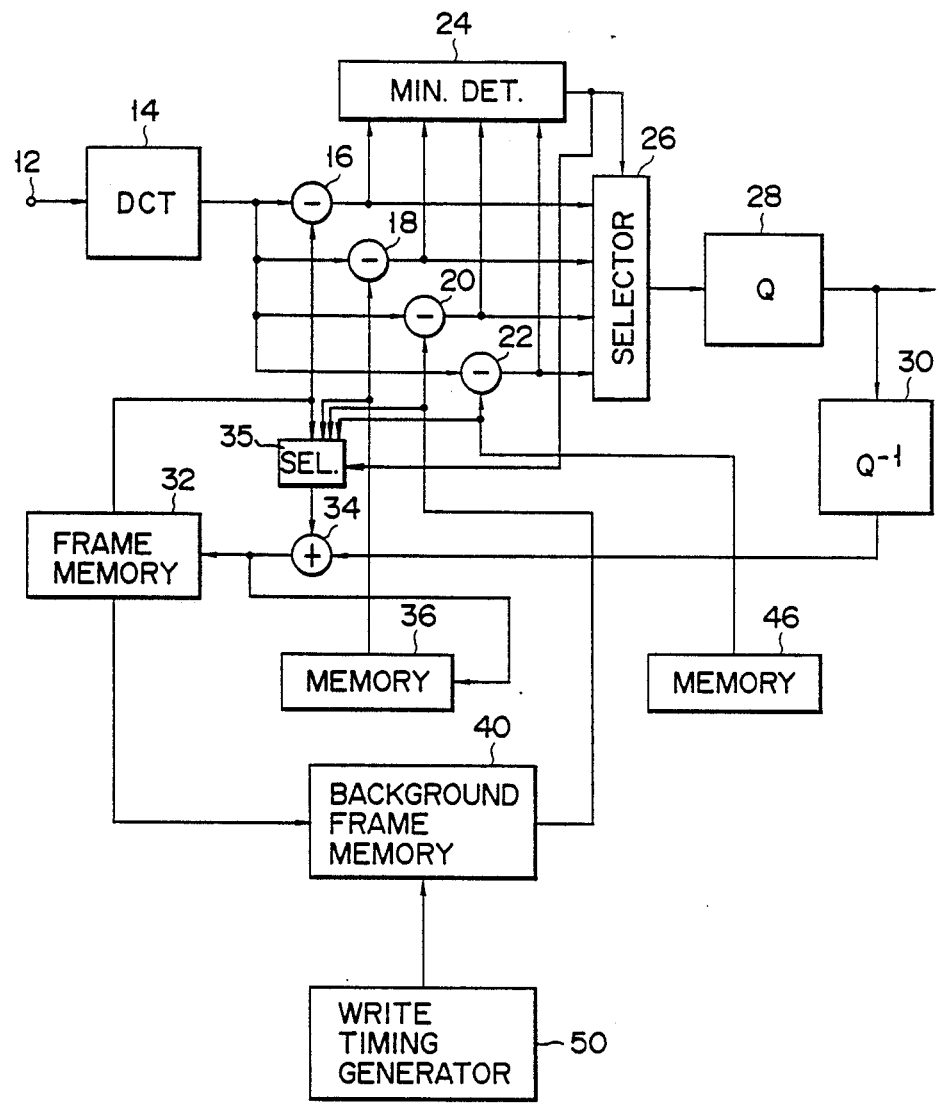
FIG. 5 is a block diagram showing a modification of the first embodiment.

FIG. 5 illustrates a modification of the first embodiment which is directed to data writing in background frame memory 40. In this modification, the data of frame memory 32 is written directly i background frame memory 40, and the write timing is controlled by a write timing generator 50 such that the content of background frame memory 40 is cyclically rewritten once every predetermined time (e.g., 5 seconds). Write timing generator 50 subjects the transmission rate of the reference clock on the transmission line (e.g., 64 Kbps) to a predetermined frequency division and generates a write timing pulse with the frequency of 1 pulse every 5 seconds.

Figure 6:
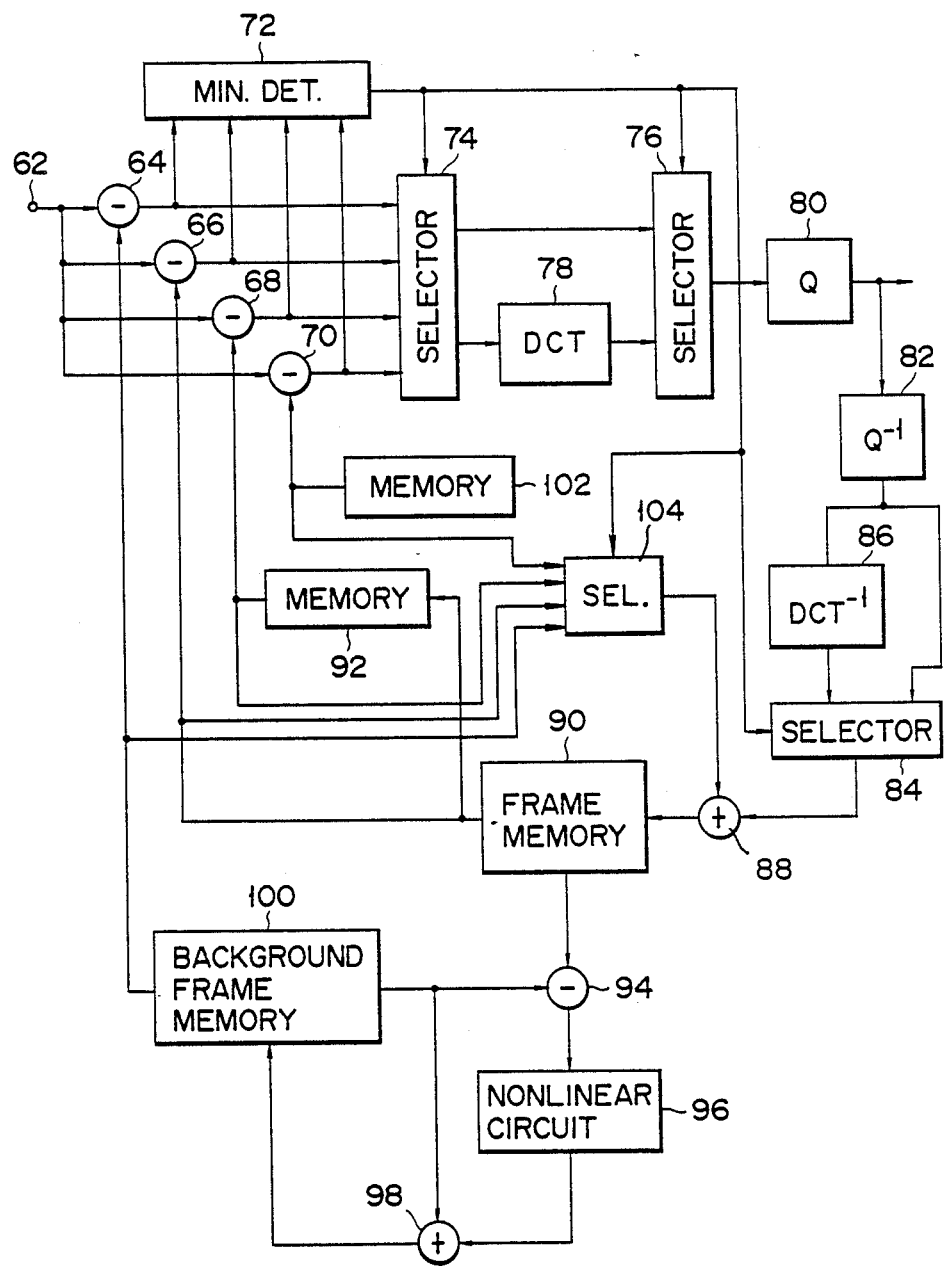
FIG. 6 is a block diagram of an image transmission apparatus according to a second embodiment of this invention.

FIG. 6 illustrates an orthogonal transform differential coding circuit according to the second embodiment. An image signal input from n input terminal 62 (here, image signals separated into blocks of 8 pixels by 8 pixels are also input block by block) is input to subtractors 64, 66, 68 and 70 to generate the differences between this image signal and first to fourth (four types of) data, respectively (these four data, unlike those in the first embodiment, are not cosine-transformed). The first to fourth difference data from subtractors 64, 66, 68 and 70 are supplied to a minimum detector 72 and also to a selector 74. Like minimum detector 24, the minimum detector 72 compares the first to fourth difference data with one another for each block to detect the smallest one. Based on the output of minimum detector 72, selector 74 selects the smallest one of the first to fourth difference data. The selected difference data is supplied as is to a selector 76 and is also supplied via a DCT 78 to selector 76. Based on the output of minimum detector 72, selector 76 supplies the difference data as is to a quantizer 80 when the selected difference data is smaller than a predetermined value, and supplies the output data of DCT 78 to quantizer 80 when the selected data is not smaller than the predetermined value. The output of quantizer 80 will be transferred onto a transmission path. Selector 76, however, may be eliminated; in this case, selector 74 needs to determine whether the output of minimum detector 72 is smaller than the predetermined value and the selected difference data needs to be controlled and supplied to quantizer 80 either directly or via DCT 78.

The output of quantizer 80 is subjected to inverse quantization by an inverse quantizer 82, and the resultant data is then supplied as is to a selector 84 and through a discrete cosine inverse transformer (DCT$^{-1}$) 86. The selector 84 is switched in association with selector 76.

The output of selector 84 is accumulatively written in a frame memory 90 through an adder 88. That is, frame memory 90 is equivalent to frame memory 32 of the first embodiment.

Of the contents of frame memory 90, data of a different block than that of the present frame is written in a memory 92. That is, memory 92 is equivalent to memory 36 of the first embodiment.

The image signal stored in frame memory 90 is written in a background frame memory 100 via a subtractor 94, a nonlinear circuit 96 and an adder 98, as is the case in the first embodiment. That is, background frame memory 100 is equivalent to background frame memory 40 of the first embodiment. The data writing in the background frame memory may be executed in the same manner as is done in the modification of the first embodiment shown in FIG. 5.

Like memory 46 of the first embodiment, a memory 102 stores specific data.

The outputs of background frame memory 100, frame memory 90, memory 92 and memory 102 are supplied as the first to fourth data to subtractors 64, 66, 68 and 70, respectively. The first to fourth data are also supplied to subtractor 88 via a selector 104. The selector 104 is controlled based on the output of minimum detector 72 in association with selectors 74 and 76.

In the first embodiment the data difference is calculated after the cosine transform, whereas it is calculated before the cosine transform in the second embodiment. What is more, according to the second embodiment, the cosine transform is not performed with respect to every block; it is however performed on the difference data of those blocks which have a greater amount of information than the predetermined amount. As compared with the first embodiment, the number of orthogonal transforms is reduced so that even an orthogonal transformer with a slower processing speed can be used and the circuit structure becomes simpler. The second embodiment produces the same effect regarding the four differences as the first embodiment, and can therefore select a difference signal based on a small amount of information to be transmitted for each block, thus always ensuring a high transmission efficiency irrespective of the degree of image change.

In the first and second embodiments, the number of pixels for each block which is the unit for cosine transform is not limited to 8×8; it may be increased to 16×16. Further, subtractors 16, 18, 20 and 22 or 64, 66, 68 and 70 for providing the four types of difference data do not necessarily need to be provided separately; they may be commonly used. Furthermore, the number of the specific patterns is not limited to one; two or more patterns may be used. In this case, the minimum value is, of course, selected from among five types of difference data, i.e., the number of types of the difference data is not limited to four.

Figure 7:
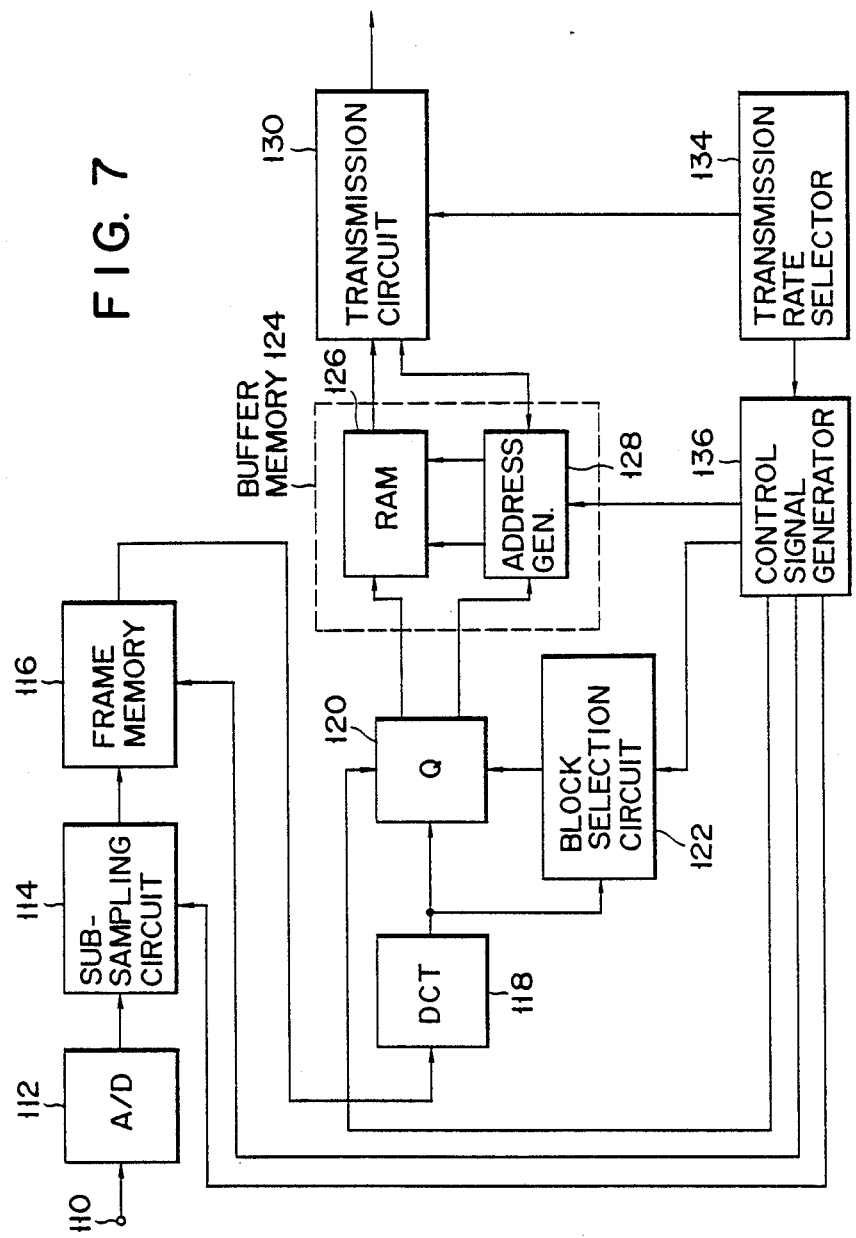
FIG. 7 is a block diagram of an image transmission apparatus according to a third embodiment of this invention.

An embodiment of an image transmission apparatus which does not affect an image quality even with a difference in the transmission rate on the transmission lines, will now be explained. FIG. 7 is a block diagram of the third embodiment with regard to an orthogonal transform coding system. An analog image signal input to an input terminal 110 is converted into a digital signal in an A/D converter 112. If the input signal of input terminal 110 is a digital signal, this A/D converter 112 is not necessary.

The output of A/D converter 112 is written through a sub-sampling circuit 114 into a frame memory 116 whose output is supplied to a cosine transformer 118. The output of cosine transformer 118 is supplied to a quantizer 120 and a block selection circuit 122. In this embodiment the entire cosine-transformed signal is not quantized and transferred, but only data with a greater amount of information than a predetermined amount is quantized and transferred. This selection is effected in block selection circuit 122.

The output of quantizer 120 is supplied to a buffer memory 124 which is formed by a RAM 126 and an address generator 128. The output of buffer memory 124 is transmitted through a transmission circuit 130 onto a digital line. The transmission rate of transmission circuit 130 is selected by a transmission rate selector 134 in accordance with the transmission rate of the digital line. In this example, there are 24 stages of transmission rate between 64 Kbps and 1.5 Mbps.

Information as to which transmission rate has been selected is supplied from transmission rate selector 134 to a control signal generator 136 where various control signals are generated in accordance with the transmission rate. These control signals are supplied to sub-sampling circuit 114, frame memory 116, quantizer 120, and block selection circuit 122.

Figure 8:
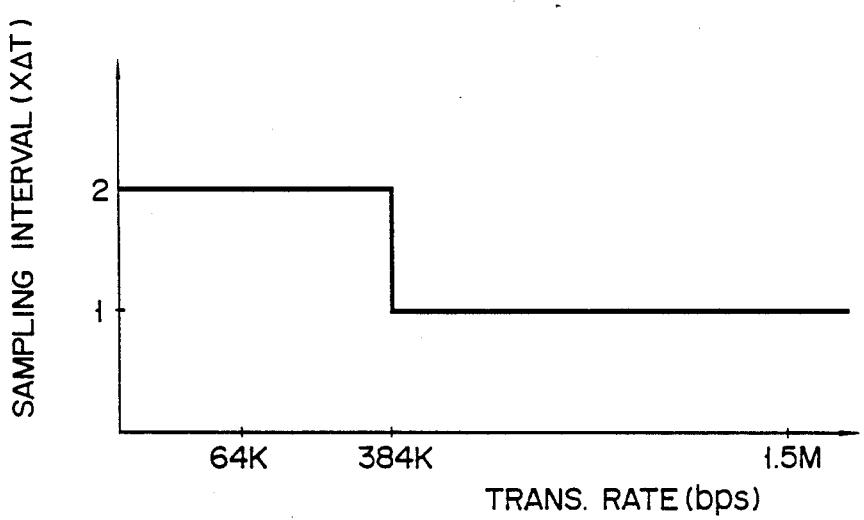
FIG. 8 is a diagram showing a sampling interval done by a sub-sampling circuit used in the third embodiment.

The image signal supplied to input terminal 110 comprises a predetermined number of pixels per frame, and these pixels are sub-sampled by sub-sampling circuit 114 so that the pixels are sampled. The sampling rate by the sub-sampling is determined by the transmission rate of the digital line. In this example the sampling rate does not have a linear characteristic with respect to the transmission rate, but has the characteristic as shown FIG. 8, for instance. To be specific, the pixels are sampled at every $\Delta T$ (time interval at which data for each pixel is output from A/D converter 112), i.e., without any sub-sampling, when the transmission rate is above 384 Kbps, and the pixels are sampled at every $2\Delta T$ (or sampled for every other pixel) when the transmission rate is below 384 Kbps. More specifically, provided that the input image comprises 500×500 pixels per frame, sub-sampling circuit 114 outputs an image signal of 500×500 pixels per frame with the transmission rate above 384 Kbps, but outputs an image signal of 250×250 pixels per frame with the transmission rate below 384 Kbps.

Here the relationship between the sub-sampling interval and the transmission rates should be noted. What should be concerned at the time the transmission rate greatly changes between high and low levels is the relationship between the coding efficiency and the processing speed. Between the transmission rates of 64 Kbps and 1.5 Mbps, the ratio of these two parameters is about 24. Accordingly, the amount of information for the rate of 64 Kbps is normally set to 1/24 of the amount of information for the 1.5 Mbps rate by the subsampling.

According to this embodiment, however, the amount of information is not reduced in proportion to the ratio, but is nonlinearly set such that the sampling interval particularly in a low transmission rate region is saturated. This is because a proportional increase in the sampling interval considerably deteriorates the image quality in the low transmission rate region. Although this characteristic provides an excess amount of information to be transmitted in the low transmission rate region, the excess information can be reduced in frame memory 116 of the next stage by reducing the number of frames per unit time.

Figure 9:
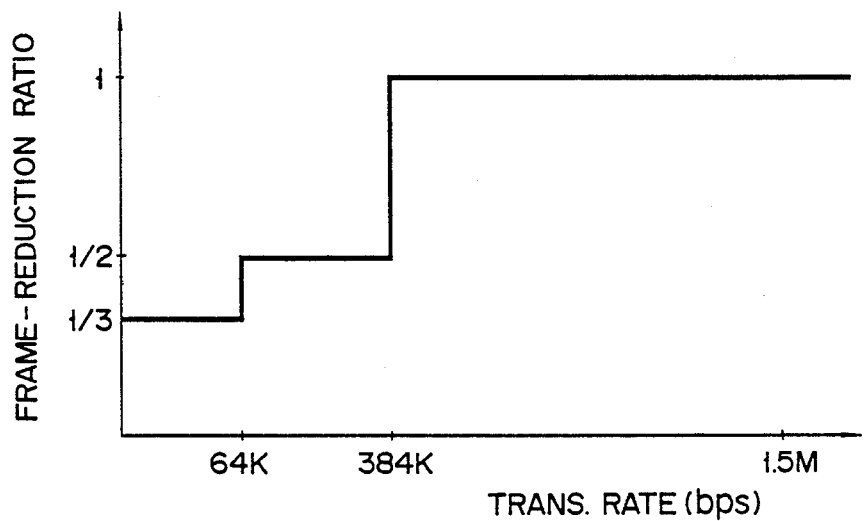
FIG. 9 is a diagram showing a frame-reduction ratio done by a frame memory used in the third embodiment.

The signal subjected to pixel sampling in subsampling circuit 114 is then subjected to frame reduction in frame memory 116, as shown in FIG. 9. Specifically, although frame memory 116 can perform signal writing and readout in the units of frames, all the frames of signals output from sub-sampling circuit 114 are written in this memory 116 when the transmission rate is above 384 Kbps, but with the transmission rate between 384 Kbps and 64 Kbps, every other frame of signals from sub-sampling circuit 114 are written in frame memory 116 (the number of frames being reduced to ½) and with the rate below 64 Kbps, every three frames of signals from sub-sampling circuit 114 are written in frame memory 116 (i.e., ⅓ frame-reduction). The ratio of the frame-reduction also varies nonlinearly with respect to the transmission rate.

The output of frame memory 116 is cosine-transformed in DCT 118, which may be the one disclosed in the 1986 Japan Television Committee Preprint 6-14, "Cosine Transforming Circuit." In this embodiment, the input image signal is cosine-transformed for each block of 8×8 pixels.

The output of DCT 118 is quantized in quantizer 120 before transmission. According to this embodiment not all the cosine-transformed signals are transmitted, but only those having more than a predetermined amount of information are transmitted.

That is, the frequency components to be transmitted are selected from the spatial frequency region after the cosine transform. The threshold value serving as a reference value for the selection is controlled by the transmission rate. More specifically, when the transmission rate is high, the threshold value is set low so as to transmit a large amount of frequency components, while the rate is low, the threshold value is set high, thus reducing the frequency components to be transmitted. For instance, the input image signal is divided into blocks for each spatial frequency component, as shown in FIG. 10A. This is done in accordance with the distribution of the spatial frequency components which tend to be distributed in bands from the upper left corner to the lower right corner in the order of low to high spatial frequency components (see FIG. 10A).

With this blocking effected, when the threshold value serving the reference level for the block selection is set low, the signal components in the shaded region in FIG. 10B are transmitted. When the threshold value is high, those components in the shaded region in FIG. 10C are transmitted.

To be specific, with the transmission rate of 1.5 Mbps, blocks B1 to B5 are selected, and with the 384 Kbps rate, blocks B1 to B4 are selected, and with the 64 Kbps rate, blocks B1 to B3 are selected.

The data of the selected blocks are quantized by quantizer 120 to be digital data with a predetermined bit. The data in unselected blocks are quantized to have 0 bits. The number of quantized bits varies with the transmission rate. The higher the transmission rate, the greater the number of quantized bits, and the lower the transmission rate, the fewer quantized bits. For instance, with regard to block B2 of FIG. 10A, the data is quantized to have 30 bits with the 1.5 Mbps rate, 20 bits with the 384 Kbps rate and 10 bits with the 64 Kbps rate.

A change in the number of quantized bits and a change in the threshold value used for the selection of blocks to be transmitted directly affect the resolution. According to this embodiment, therefore, these changes, the sub-sampling interval, and the frame-reduction ratio are determined in consideration of their influence on the resolution (image quality) in such a particular way as to provide an image quality above a certain level even at a low transmission rate, as shown in FIG. 11. The broken line represents the resolution obtained when these changes, the sub-sampling interval, and the frame-reduction ratio are linearly altered with respect to the transmission rate.

The signals quantized in quantizer 120 are written in buffer memory 124. When data is written in buffer memory 124 and an amount of stored data is larger than a preset maximum capacity which is not larger than the whole capacity thereof, the writing is temporarily interrupted. When data is read out from buffer memory 124 and the amount of stored data is smaller than the preset maximum capacity, data writing in memory 124 starts again. The preset maximum capacity of buffer memory 124 (RAM 126) varies depending on the transmission rate, and is set to be 128 Kbits with the transmission rate between 384 Kbps and 1.5 Mbps, 48 Kbits with this rate between 64 Kbps and 384 Kbps, and 8 Kbits with the rate lower than 64 Kbps.

Varying the preset maximum capacity of the buffer memory has the following effects. The amount of information to be transferred varies in accordance with the transmission rate; that is, the higher the transmission rate, the greater the amount of information that is to be transferred, and the lower the rate, the smaller the information amount. Provided that the maximum capacity of buffer memory 124 is constant, the capacity should be determined in anticipation of the maximum amount of information to be transmitted. Therefore, the maximum capacity of buffer memory 124 is optimally set with respect to the maximum transmission rate. As a result, with the lowest transmission rate, it would take a considerable amount of time to write data to the maximum capacity in buffer memory 124. In other words, a delay occurs in the transmission control due to the amount of data stored in the buffer, and a still picture continues to be displayed for several seconds even though a motion picture is being transmitted.

In contrast to the above, the preset maximum capacity of buffer memory 124 decreases with the reduction in the transmission rate of this embodiment, so that lagging of the transmission time does not occur. What is more, control of the threshold value, such as selection of some blocks by the amount of stored data in the buffer memory, can be executed smoothly. When the maximum capacity of the buffer memory is set to a large value, the threshold value is increased so as to decrease the amount of code to be transferred. On the contrary, when the maximum capacity is set to a small value, the threshold value is decreased so as to increase the amount of code. When the maximum capacity is small, the variation of the ratio between the amount of stored data and the maximum capacity is large and the feedback control is made quickly.

Here, strictly speaking, the preset maximum capacity of buffer memory 124 is not directly proportional to reduction in the transmission rate, because the amount of codes generated per one frame varies due to the frame-reduction becoming greater as the transmission rate gets lower. Since the preset maximum capacity of buffer memory 124 can be set to a relatively small value at a high transmission rate, as described above, the maximum memory capacity and the transmission rate do not have a strict proportional relationship.

Buffer memory 124 does not necessarily be constituted by RAM 126 and may be formed by a FIFO.

When data is stored to the preset maximum capacity in RAM 126, a signal instructing data readout is supplied to transmission circuit 130 from address generator 128. If transmission circuit 130 is ready for its transmission action, address generator 128 reads out signals stored in RAM 126 in the stored order. The read signals are sequentially supplied to transmission circuit 130 to be sent on the digital line.

A practical structure for varying the preset maximum capacity of buffer memory 124 will now be explained. As mentioned earlier, according to this embodiment, the transmission rate is divided into 24 levels between 64 Kbps and 1.5 Mbps. The selection of a proper rate is done by transmission rate selector 134, which supplies the information about the selected transmission rate as 5-bit data to control signal generator 136. This control signal generator 136 serves as a conversion table. That is, based on the signal from transmission rate selector 134 which indicates the selected transmission rate, control signal generator 136 outputs a value indicating the preset maximum capacity of buffer memory 124. For instance, with the transmission rate of 64 Kbps selected, control signal generator 136 outputs a value representing the capacity value of 8 Kbits. Similarly, with the transmission rate of above 64 Kbps but below 384 Kbps selected, a capacity value representing 48 Kbits is output from the generator 136. If the selected transmission rate lies in the range between 384 Kbps and 1.5 Mbps, a capacity value representing 128 Kbits is output. The capacity of buffer memory 124 may be linearly varied between 64 Kbps and 1.5 Mbps.

In response to thus generated capacity value signals, address generator 128 performs an address control, i.e., compares the preset maximum capacity value with the write address for RAM 126. When the write address coincides with the maximum capacity value, the writing is stopped. Data readout from buffer memory 24 onto transmission circuit 130 is always being carried out.

Control signal generator 136 generates control signals not only for address generator 128, but also for sub-sampling circuit 114, frame memory 116, quantizer 20 and block selection circuit 122. For instance, in accordance with the transmission rate, control signal generator 136 generates a signal to specify the interval of pixel sampling to sub-sampling circuit 114, a signal to specify the frame-reduction ratio to frame memory 116, and generates a signal to specify the number of quantized bits to quantizer 120. With respect to block selection circuit 122, the control signal generator 136 generates a signal to specify a threshold value used as a reference for block selection in accordance with the transmission rate.

As described above, according to the third embodiment, the operation and characteristic of each structural element are controlled in accordance with the transmission rate. In addition, the control is nonlinearly done for each structural element. That is, with regard to that structural element (pixel sampling ratio) which would affect the resolution, its operation characteristic is not reduced proportionally to reduction in the transmission rate, but is kept above a given level even at a low transmission rate, so that the amount of information (the number of frames per unit time) in the direction of the time axis is accordingly reduced more than a value proportional to the transmission rate. This would cause a slightly unnatural movement of a motion picture at a low transmission rate, but can keep the resolution above a given level.

The following explains how to construct a network according to this embodiment. When a transmitting-/receiving device at one location in the network is used as a transmitter at one transmission rate, transmission rate selector 134 selects the transmission rate for the line. Prior to transmission of an image signal, this transmitter informs a receiver (transmitting/receiving device used as a receiver) of the transmission rate selected on the transmitter side. After the transmission rate is confirmed between the transmitter and receiver, the image signal is transmitted.

Figure 12:
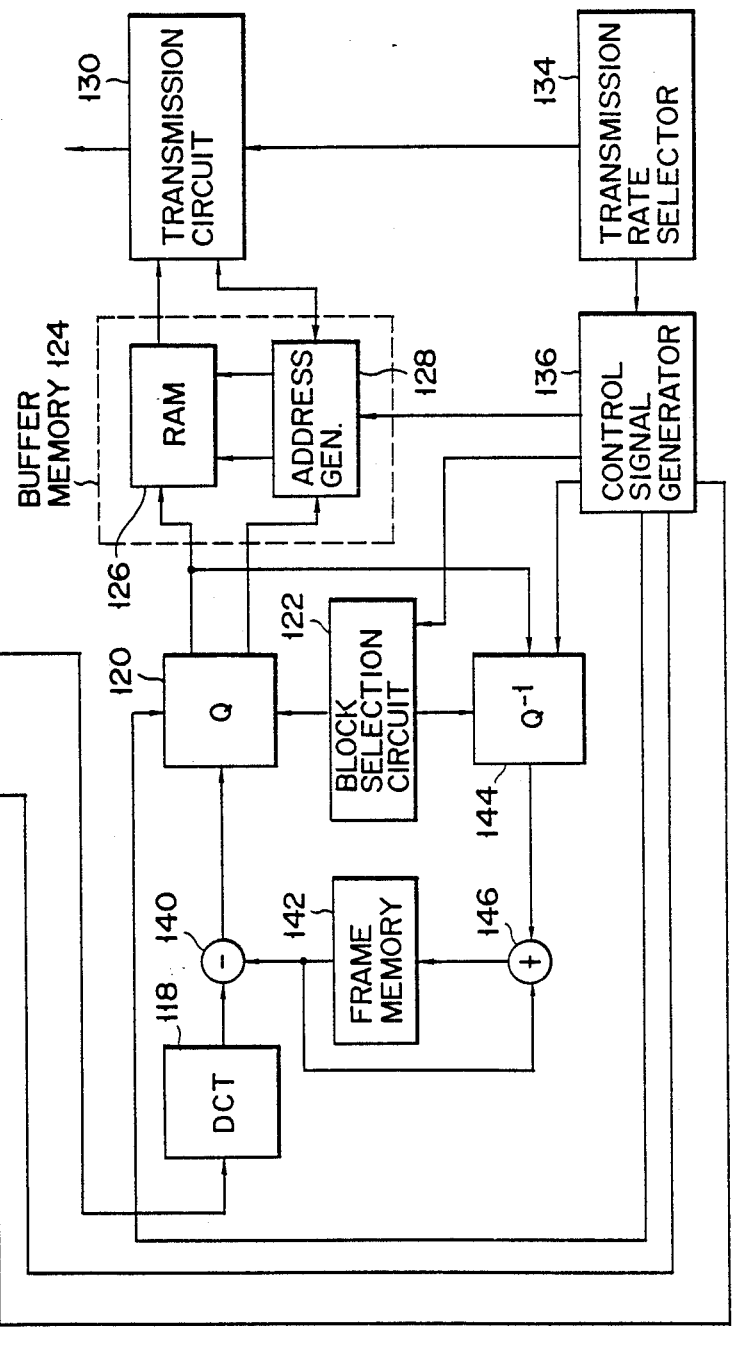
FIG. 12 is a block diagram showing a first modification of the third embodiment.

FIG. 12 is a block diagram of a first modification of the third embodiment. This modification is an example of a so-called orthogonal transform differential coding apparatus, which does not quantize a cosine-transformed signal (converted signal) as it is for signal transmission, but attains the difference between a converted signal at one time and a converted signal at one previous time (one previous sampling time $\Delta T$) and quantizes the difference signal. Specifically, a subtractor 140 is coupled between DCT 118 and quantizer 120, so that the difference between the outputs of DCT 118 and frame memory 142 is input to the quantizer 120. The output of quantizer 120 is written through an inverse quantizer 144 into frame memory 142. An adder 146 is coupled between the inverse quantizer 144 and frame memory 142 so as to add their outputs, and the added data is written again in frame memory 142. That is, an image of one previous frame is stored in frame memory 142.

Since this modification acquires the quantization of the difference of present and previous image signals, the coding efficiency is improved as compared with the third embodiment.

Figure 13:
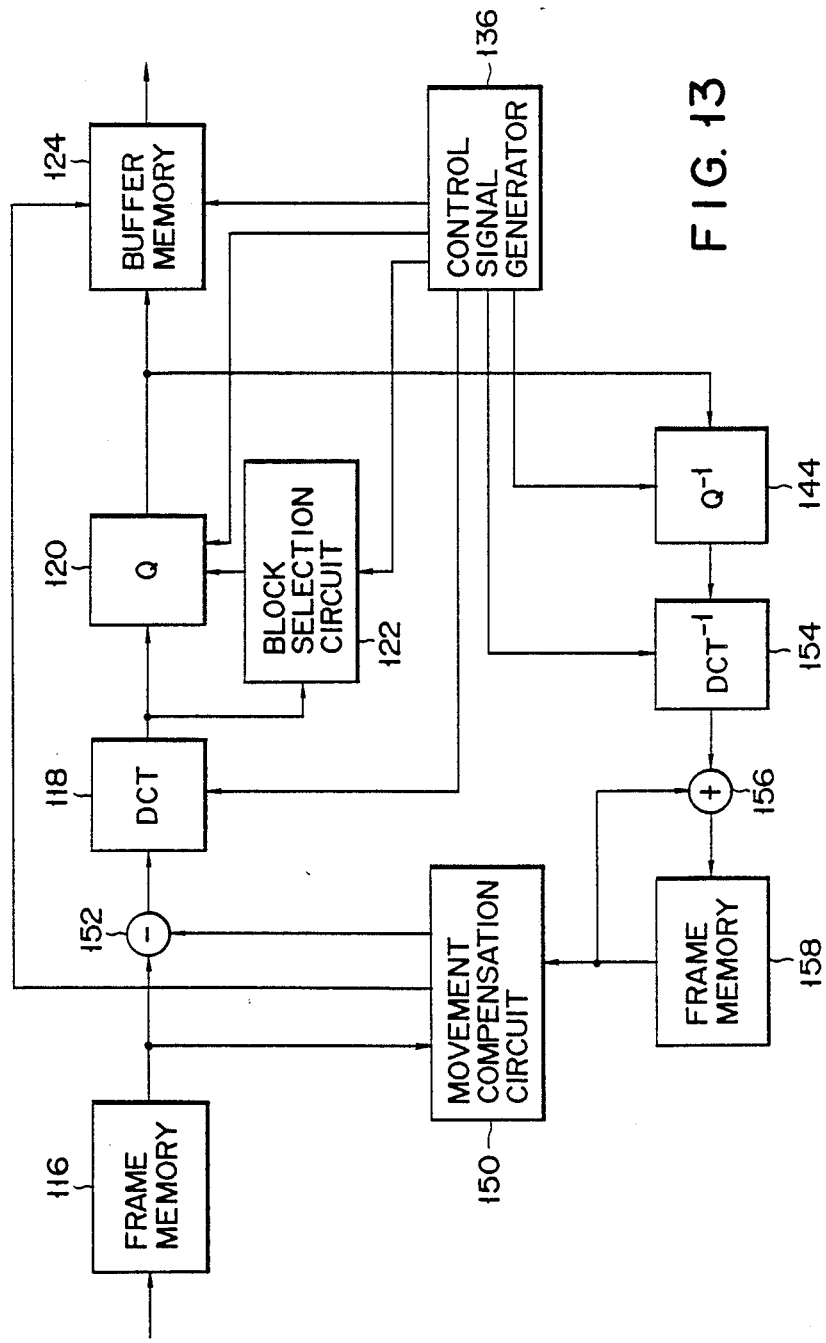
FIG. 13 is a block diagram showing a second modification of the third embodiment.

FIG. 13 is a block diagram of a second modification of the third embodiment. This modification performs information compression using predicted movement data. To be specific, a movement compensation circuit 150 acquires a movement vector and also predicted movement data using the output of frame memory 116 and the output of a frame memory 158 for storing an image of one previous frame. A subtractor 152 obtains the difference between the output of frame memory 116 and the predicted movement data, and this difference is transmitted through a DCT 118 and a quantizer 120.

Meanwhile, the output of quantizer 120 is converted through an inverse quantizer 144 and a $DCT^{-1}$ 154 into an original difference signal. This difference signal is added to the signal stored in frame memory 158 by adder 156 to be an image signal of one previous period and is written back into frame memory 158.

According to this modification, the predicted movement data is used for information compression, so that the differential coding can be executed more effectively.

Though not shown in the drawing, it is possible to combine the orthogonal transform four-differential coding system according to the first or second embodiment and the coding system according to the first or second modification of third embodiment. In this case, the subtractor 140 or 152 and its associated circuit are replaced by the circuit shown in FIG. 3, 5, or 6.

Figure 14:
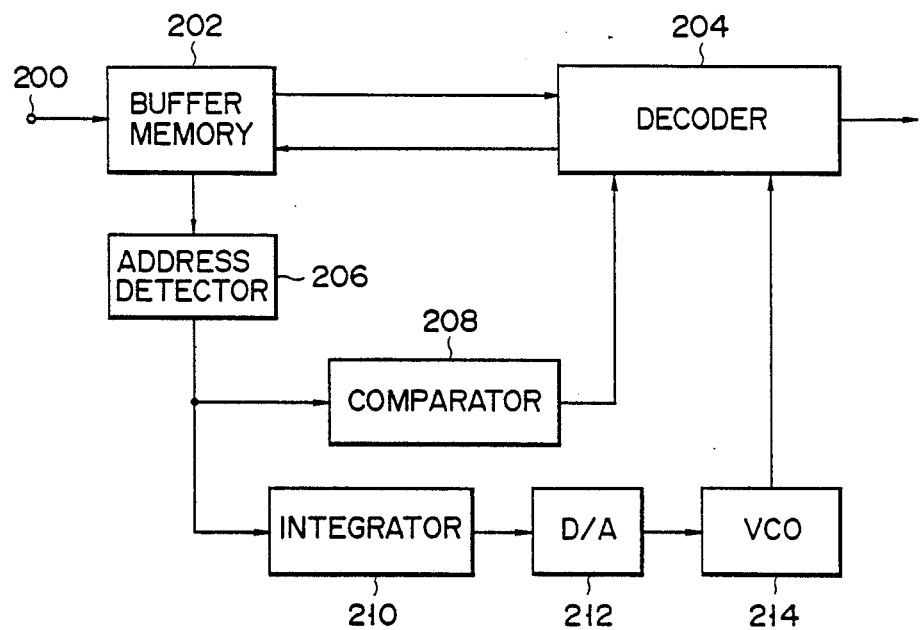
FIG. 14 is a block diagram of an image transmission apparatus according to a fourth embodiment of this invention.

The following explains a fourth embodiment designed for preventing overflow or underflow of a receiver's buffer memory from occurring due to the difference between the coding speed and the decoding speed. FIG. 14 is a block diagram of the fourth embodiment. Transmitted signals input through a reception terminal 200 coupled to a transmission line are sequentially written into a buffer memory 202. When a data request signal from a decoder 204 is sent to buffer memory 202, its associated signal written in buffer memory 202 is read out and decoded to the original signal by decoder 204, and is then output.

The amount of information stored in buffer memory 202 is detected by an address detector 206 in the form of the address difference which is obtained by subtracting the read address from the write address and is compared with a threshold value set in advance by a comparator 208. Until the address detected by address detector 206 reaches the threshold value, comparator 208 keeps supplying a decoding inhibit signal to decoder 204 to inhibit the decoding operation. That is, the decoding is stopped until the amount of the data stored in buffer memory 202 reaches a given value. When the address detected by address detector 206 reaches the threshold value (or when the amount of the data stored in buffer memory 202 reaches the give value), comparator 208 stops supplying the decoding inhibit signal to decoder 204 so as to start the decoding operation.

Meanwhile, the address difference detected by address detector 206 is also supplied to an integrator 210 where the amount of the data stored in buffer memory 202 is subjected to integral calculation over a given period of time. The attained integral is converted into an analog voltage value in a D/A converter 212, which serves as a control voltage of a voltage-controlled oscillator (VCO) 214. In other words, the oscillation frequency of VCO 214 is controlled in accordance with the amount of the data stored in buffer memory 202. Decoder 204 receives the oscillation signal of VCO 214 as a clock and decodes the signal read from buffer memory 202 at a speed according to the frequency of the clock.

If the decoding speed is higher than the coding speed, the readout speed of buffer memory 202 is higher than the writing speed of the buffer memory 202, which seems to cause underflowing of this buffer memory. According to this embodiment, however, when the amount of data to be written in buffer memory 202 decreases before the memory 202 underflows, the address difference detected by address detector 206 falls below the threshold value. This supplies the decoding inhibit signal to decoder 204 to stop its decoding operation. As a result, the decoding speed appears to have been reduced and becomes equal to the coding speed. Accordingly, the integral value of the data stored in buffer memory 202 over a given period of time is decreased, thus reducing the oscillation frequency of VCO 214 and the clock frequency for decoder 204.

On the other hand, when the decoding speed is lower than the coding speed, the readout speed of buffer memory 202 is lower than the writing speed of the memory so that buffer memory 202 seems to overflow. According to this embodiment, however, the oscillation frequency of VCO 214 increases before the overflow of buffer memory 202 due to an increase in the integral value of the amount of data stored in buffer memory 202 over a given time. This increases the clock frequency for decoder 204 so as to increase the decoding speed to coincide with the coding speed.

In other words, in accordance with the amount of data stored in buffer memory 202, i.e., (1) when this amount is below a preset value (when the buffer memory seems to underflow), the decoding operation is stopped, and (2) when this amount is above the preset value (when the buffer memory seems to overflow), the decoding speed is increased, whereby the coding speed can coincide with the decoding speed. What is more, this control is done by simply adding a control circuit on the receiver side and no additional circuit on the sender side. It is also unnecessary to affix insignificant dummy information to an image signal.

Figure 15:
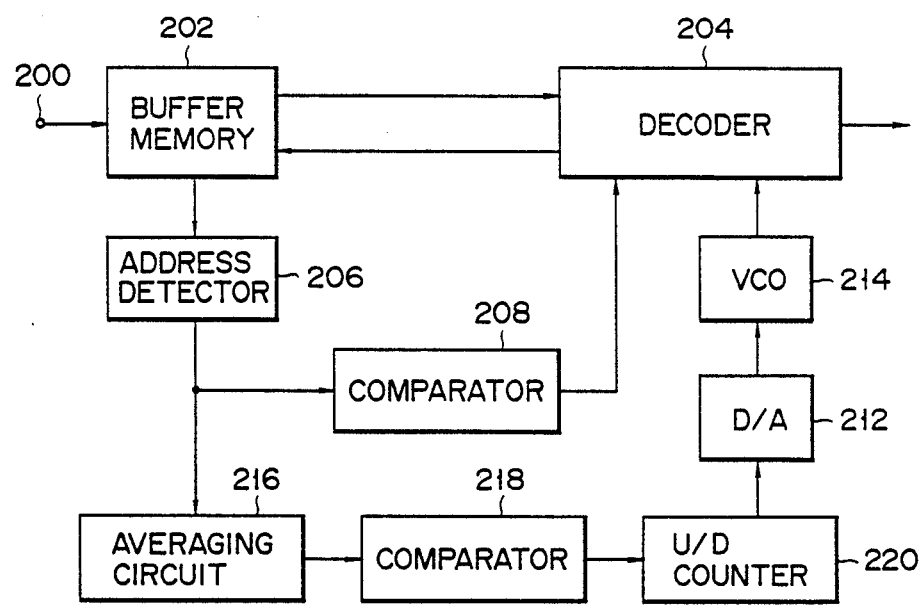
FIG. 15 is a block diagram showing a modification of the fourth embodiment.

As a modification of the fourth embodiment, integrator 210 may be replaced by a averaging circuit, a comparator, and an up/down counter, as shown in FIG. 15. An circuit 216 attains the average, over a given time, of the address difference detected by address detector 206 (which indicates the amount of the data stored in buffer memory 202). A comparator 218 compares the average value with a predetermined threshold value, and based on the comparison result, an up/down (U/D) counter 220 up-counts or down-counts its count value. Specifically, U/D counter 220 up-counts when the average value is greater than the threshold value and down-counts when it is smaller than the threshold value. The count value of U/D counter 220 is supplied through D/A converter 212 to VCO 214 so as to control the oscillation frequency thereof. This can also changes the decoding speed in inverse proportion to a change in the amount of data stored in buffer memory 202, so that the coding speed can coincide with the decoding speed.

According to the fourth embodiment, the amount of data stored in the buffer memory is detected by the address difference between the write address and the read address; however, this detection is not limited to this method. For instance, the detection may be effected by the writing time, etc. In addition, the operation speed of the decoder may be controlled by a parameter other than the clock frequency.

Figure 16:
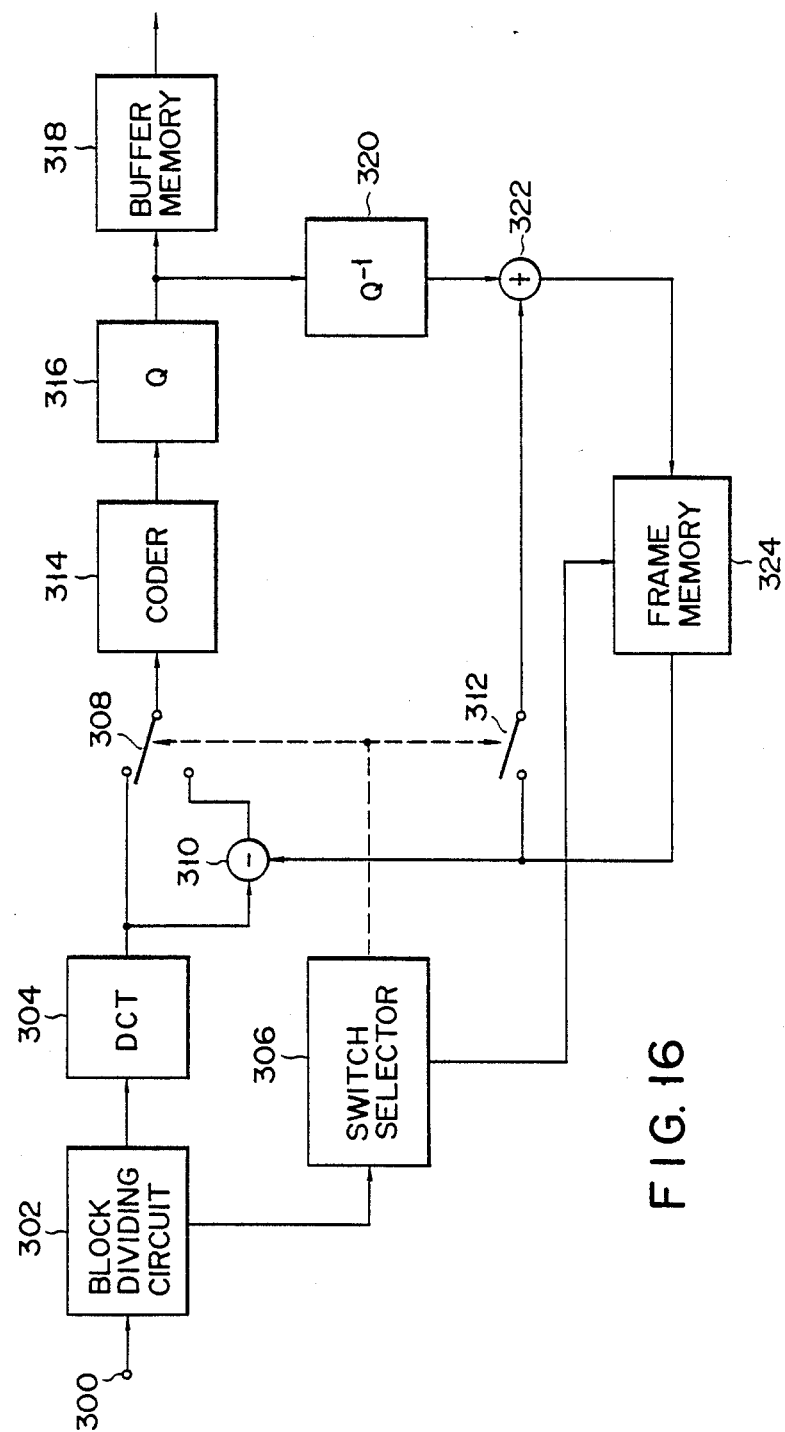
FIG. 16 is a block diagram of a sender side of an image transmission apparatus according to a fifth embodiment of this invention.

The following explains a fifth embodiment which can effectively refresh a buffer memory for storing an image signal of one previous frame. This embodiment comprises a sender unit and a receiver unit; FIG. 16 is a block diagram of the sender unit and FIG. 17 a diagram of the receiver unit. In the sender unit, an image signal is input through an input terminal 300 to a block dividing circuit 302 in such a manner that one frame of image signals are divided into blocks (8×8 pixels). Then, the divided image signal is cosine-transformed by a DCT 304 for each block. The output of DCT 304 is coupled as it is to the first terminal of a selector switch 308 and through a subtractor 310 to the second terminal of switch 308.

A block address signal (a certain ordered signal as counted from the upper left block of a frame) that indicates which block is presently cosine-transformed, is supplied to a switch selector 306 equipped with a counter. This counter generates a block address in each frame, which should be refreshed, or transmits a code of a present signal instead of a code of a difference signal. When the block address signal from block dividing circuit 302 does not coincide with the block address from the counter, selector 306 sets switch 308 to the second terminal and turns switch 312 on When these coincide with each other, selector 306 sets switch 308 to the first terminal and turns switch 312 off.

The output of switch 308 is input to a coder 314 to be subjected to a significant block discrimination, etc. The output of coder 314 is quantized in a quantizer 316 and is then written in a buffer memory 318. The code is read out from buffer memory 318 at a given bit rate in accordance with the transmission rate of the transmission path.

To attain a signal difference between frames, the output of quantizer 316 is also supplied to an inverse quantizer 320 whose output is written in a frame memory 324 through an adder 322. The output of frame memory 324 is supplied through switch 312 to adder 322. When it is not a refresh block (when switch 312 is on), therefore, adder 322 adds the image signal of one previous frame (after cosine transform) and the difference signal to reproduce the present image signal, and this signal is stored in frame memory 324. The output of frame memory 324 is supplied to subtractor 310 to attain the signal difference between frames.

When the block being cosine-transformed is not to be refreshed, a cosine-transformed signal is subtracted (or subjected to the signal difference between frames) from the transformed signal of one previous frame by subtractor 310. The difference is input to coder 314, is quantized by quantizer 316, and is then transmitted. That is, the between-frame difference signal is transmitted in this case.

When the cosine-transformed block is to be refreshed, switch 308 is switched to be coupled to DCT 304 so that the cosine-transformed signal is transmitted as it is. To distinguish this signal from the difference signal, the former signal is affixed with a flag. Since switch 312 is off at this time, adder 322 does not perform any addition and the data in frame memory 324 is rewritten by the inverse-quantized signal.

On the receiver side as shown in FIG. 17, the signal transmitted over the transmission path is written through an input terminal 330 into a buffer memory 332. This signal is then supplied through an inverse quantizer 334 to a decoder 336 which determines whether the received signal is a difference signal or a refresh signal (cosine-transformed signal) by checking the flag. The output of decoder 336 is supplied through an adder 338 to a $DCT^{-1}$ 340 and then to a frame reproduction circuit 342.

Meanwhile, the output of adder 338 is written in frame memory 344, whose output is supplied through a switch 346 to adder 338.

When decoder 336 determines the received signal to be the difference signal, it turns on switch 346. This causes adder 338 to add the signal of one previous frame stored in frame memory 344 to the transmitted difference signal to reproduce an image signal of the present frame. This image signal is written in frame memory 344. The reproduced image signal is subjected to an inverse cosine-transform so that it is converted from the signal of a spatial frequency region to a signal of a time region. The resultant signal is subjected to frame reproduction and is then output as a reproduced image.

When decoder 336 determines the received signal to be the refresh signal, it turns switch 346 off. This causes adder 338 to perform no addition so that the transmitted refresh signal is written in frame memory 344. The address in this case is specified by a counter 348, which generates the same count value as the counter provided in switch selector 306 in the sender unit.

FIG. 18 illustrates that the refreshing is done to one block for each frame. Suppose that an each frame image is input from an image input terminal 300 to block dividing circuit 302 and is divided into n blocks B1 to Bn. Then, before the frame image is coded by coder 314, the refreshing is done to one block for each frame. For the first frame F1, block B1 at address 1 is transmitted in the form of a cosine-transformed signal and the other blocks are transmitted as difference signals. Similarly, blocks B2 and B3 at addresses 2 and 3 are transmitted as cosine-transformed signals respectively for the second and third frames F2 and F3. With regard to the n-th frame Fn, block Bn at address n is transmitted as a cosine-transformed signal. Regarding the (n+1)th frame Fn+1, however, like the first frame, block B1 at address 1 is transmitted as a cosine-transformed signal.

When the number of blocks n in one frame is 1800 and the transmission rate is 30 frames per second, all the blocks are surely refreshed within one minute, so that occurrence of a transmission error does not raise any problem.

According to this embodiment, since a cosine-transformed signal for the refreshing purpose is transmitted from a sender side together with a flag for every given interval, unlike the conventional system, the line capacity does not substantially decrease because of the signal transmission between the sender and receiver through a re-send signal, and an error detector and a re-send request signal generator for ensuring the proper signal transmission or a memory for holding the refresh signal (cosine-transformed signal) for a given period are not necessary. In addition, undesirable delay which may caused by the provision of such elements, can certainly be prevented.

According to the conventional system, particularly, coding of the difference signal between orthogonal transform frames is done in the units of blocks so that eve a single parameter is in error, the entire information in one block should be sent again. According to this invention, however, not all of orthogonal transform signals need to be transmitted as refresh signals; low frequency signals are sufficient for the purpose, as has been explained with respect to block selection circuit 122 of the third embodiment. If a motion picture does not move significantly, the amount of information of the difference signal would decrease. At such a time, therefore, the number of blocks to be sent as refresh signals may be increased so as to ensure that a certain amount of information should always be transmitted. This reduces the time required to refresh all the blocks.

In the above, the individual blocks are sequentially refreshed at a given cycle; however, the refreshing is not limited to this type but may be executed in a random order, as long as all the frames can be refreshed within a given time.

Figure 19:
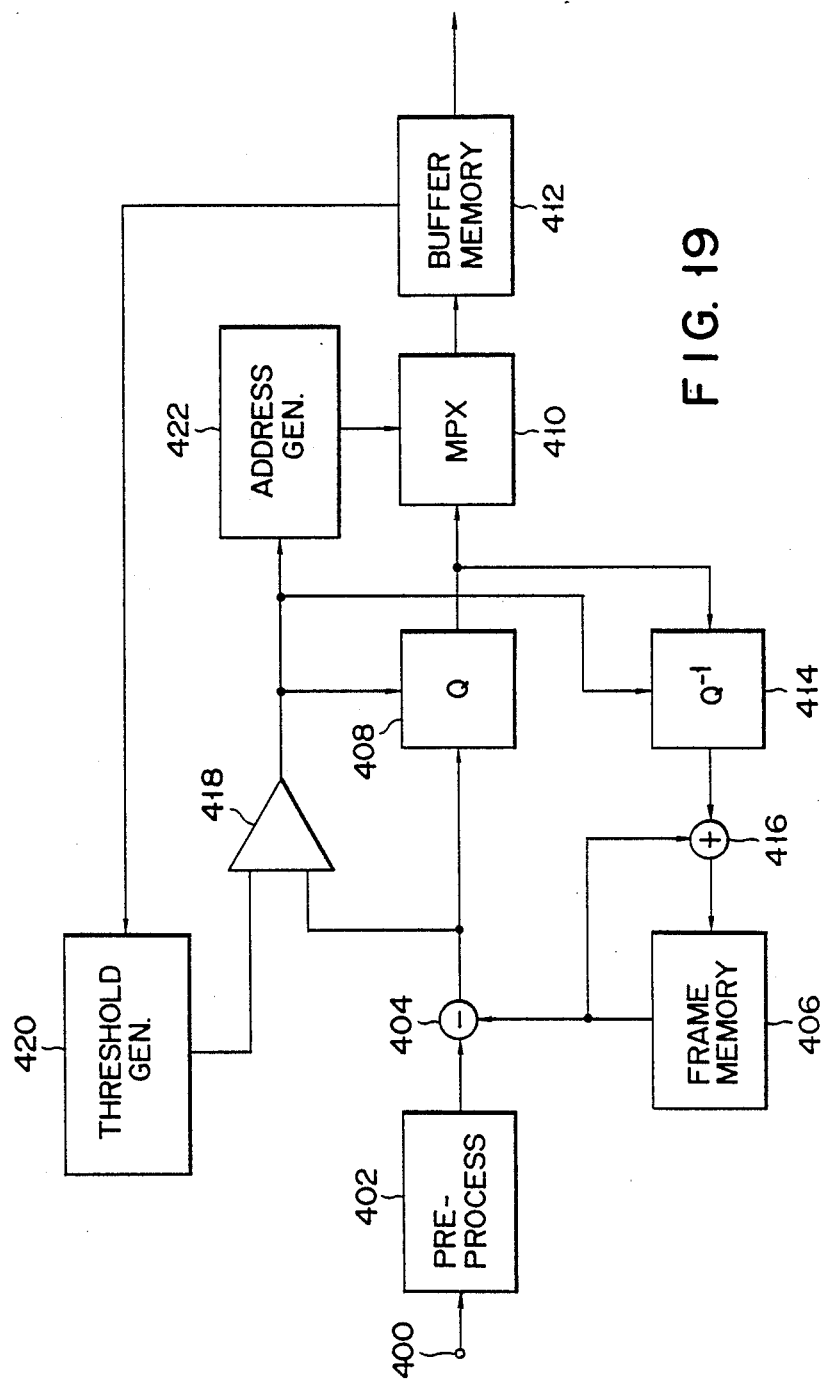
FIG. 19 is a block diagram of a sender side of an image transmission apparatus according to a sixth embodiment of this invention.
Figures 21, 22:
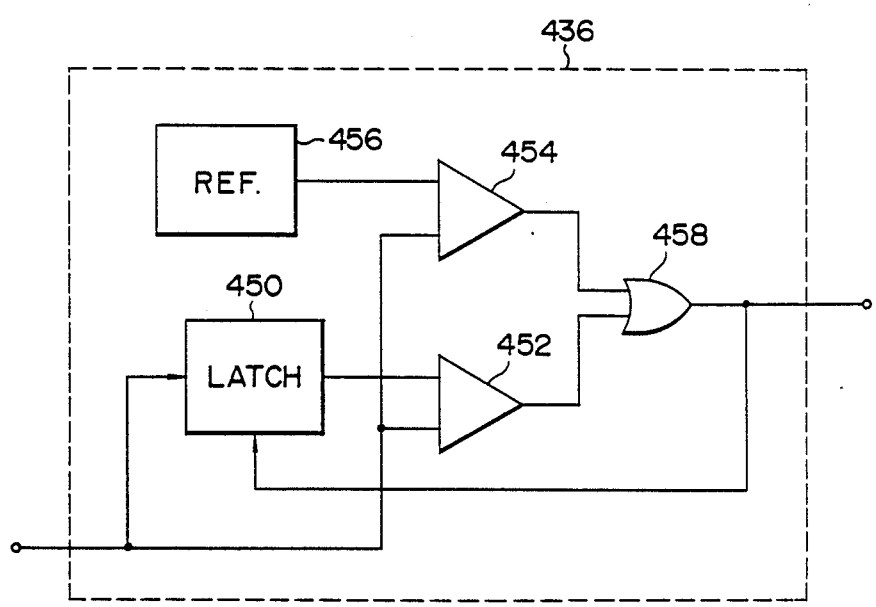
FIG. 21 is a diagram exemplifying a block division done in the sixth embodiment.
FIG. 22 is a block diagram showing an address check circuit on a receiver side of the sixth embodiment.

A sixth embodiment of this invention, which is directed to detection of a transmission error in the differential coding system, will now be explained. The sixth embodiment comprises a sender unit and a receiver unit, which are illustrated in block diagrams in FIGS. 19 and 20, respectively. In the sender unit, an image signal is input through an input terminal 400 to a pre-processing circuit 402, which performs a preprocess such as filtering and separation an image in blocks. Block data are output from pre-processing circuit 402 in the form of block scanning as shown in FIG. 21 in the sequence of block addresses A(0,0), A(0,1), ... A(i,0), A(i,1), ..., A(i,j), ...

An image signal divided into blocks in preprocessing circuit 402 is supplied to a subtractor 404, which attains the difference between a received image signal and the same block of an image signal of one previous frame stored in a frame memory 406. The difference is supplied through a quantizer 408 to a multiplexer 410, which multiplexes the quantized difference signal and the block address A(i,j) and outputs the resultant signal on a transmission path through a buffer memory 412. Data is read out from the buffer memory 412 in accordance with the transmission rate.

The output of quantizer 408 is also supplied to an inverse quantizer 414, whose output is written in frame memory 406 through an adder 416. The adder 416 adds the outputs of frame memory 406 and inverse quantizer 414 and then writes the resultant data in frame memory 406. Consequently, an image signal of one previous frame is now written in frame memory 406.

The difference signal from subtractor 404 is also supplied to a comparator 418 where it is compared with a threshold value, generated from a threshold generator 420 in accordance with the amount of data stored in buffer memory 412. When this difference signal is larger than the threshold value, quantizer 408 is operated to quantize the difference. When the difference signal is smaller than the threshold value, then quantizer 408 is not operated.

FIG. 20 illustrates the circuit structure of the receiver unit. A signal on the transmission path is input to a receiver's buffer memory 430. The output of buffer memory 430 is supplied to a demultiplexer 432 to be separated into a block address A(i,j) and an image signal. The block address is latched in an address decoder 434 and is then checked by an address check circuit 436.

The address check circuit 436 is illustrated in detail in FIG. 22. The block address is compared by a comparator 452 with the block address of one previous block latched in a latch circuit 450. When the present block address comes earlier on the scanning line than the previous block address, comparator 452 generates an "H" signal. For instance, provided that the previous block address is A(a,b) and the present block address is A(c,d) (where a, b, c, d>0), the "H" signal is generated when a>c or when a=c and b>d.

The block address is also compared in a comparator 454 with a reference value A(e,f) generated from a reference generator 456. The items e and f of the reference value A(e,f) are respectively set to the maximums of the block address in the vertical and horizontal directions. Comparator 454 compares the present block address A(a,b) with the reference address A(e,f) and generates the "H" signal when c>e and/or d>f.

The outputs of comparators 452 and 454 are output as an address check signal through an OR gate 458. This address check signal is supplied to a latch terminal of latch circuit 450. When the address check signal is at an "L" level, latch circuit 450 considers it as no transmission error occurred and the received data being correct, and rewrites its content. Latch circuit 450 is reset (to the first block address in the block scanning) for each frame received.

Referring again to FIG. 20, the address check signal output from address check circuit 436 is supplied to inverse quantizer 438. When the address check signal is at the "L" level, inverse quantizer 438 performs the inverse quantization and its output is added by adder 440 to the image signal of one previous frame stored in frame memory 444, thereby reproducing the image signal of the present frame. The output of adder 440 is supplied to a post-processing circuit 442 where a block scanning signal is converted to an original image signal and is output therefrom.

According to the sixth embodiment, as has been explained above, a transmission error can be easily detected by checking the block address by the receiver unit (i.e., by comparing the block address with the address of the previously-transmitted block and checking the upper limit of the block address). And no special circuit for transmission error detection is needed in the sender unit. Further, no special signal for transmission error detection needs to be sent. When a transmission error is detected by the receiver unit, the received data is not decoded so that incorrect image data will not be accumulated in the differential coding system, thus preventing the quality of an image from deteriorating. Upon detection of a transmission error, the receiver unit sends a re-send request signal to the sender unit to wait the correct codes to be sent again.

Figure 23:
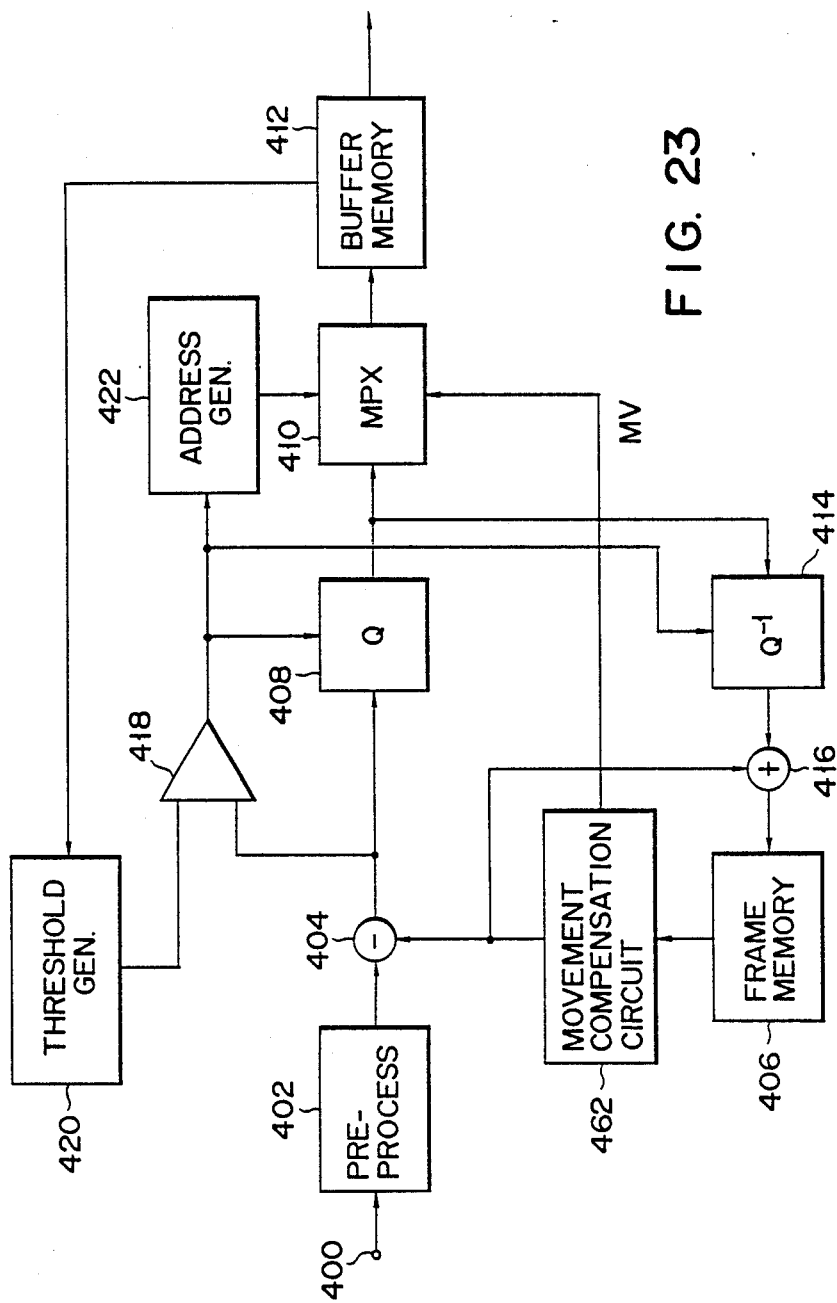
FIG. 23 is a block diagram showing a sender side of a modification of the sixth embodiment.
Figure 24:
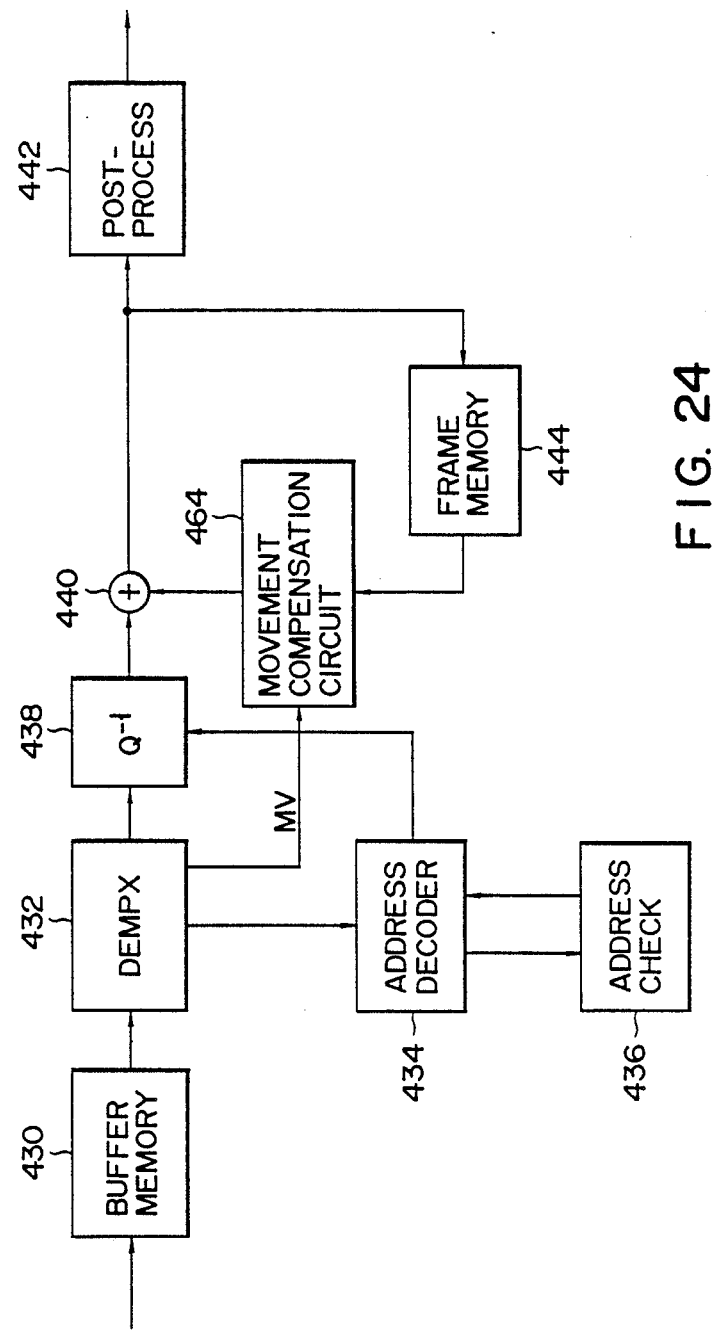
FIG. 24 is a block diagram showing a receiver side of a modification of the sixth embodiment.

The following explains a modification of the sixth embodiment, which performs movement compensation by comparing one previous image and a present image. FIG. 23 is a block diagram of the sender unit of the modification of the sixth embodiment, and FIG. 24 is a block diagram of the receiver unit of the modification. In the sender unit, a movement compensation circuit 462 is added between the output of frame memory 406 and subtractor 404, while in the receiver unit, a movement compensation circuit 464 is added between the output of frame memory 444 and adder 440. The sender's movement compensation circuit 462 compares the image of the present frame with the image of one previous frame so as to detect where on the present image the image of the previous frame is moved (i.e., movement vector: MV). The movement vector is supplied to multiplexer 410. Movement compensation circuit 462 supplies the one previous image, which has bee shifted in accordance with the movement vector, to subtractor 404.

Subtractor 404 attains the difference between the output of pre-processing circuit 402 and the already transmitted image whose movement vector has been obtained by movement compensation circuit 462. Consequently, the difference for the image signal that has been subjected to movement compensation in movement compensation circuit 462, which shifts the one previous image so as to coincide the one previous image and the present image, is significantly smaller than the difference attained without movement compensation. This reduces the number of quantized bits and also the amount of information to be transmitted as a consequence.

A quantized signal is multiplexed with the block address and the movement vector by multiplexer 410.

The received signal is separated into image data (quantized signal), a block address and a movement vector by demultiplexer 432. The separated block address is checked in this modification as per the sixth embodiment. The movement vector MV is supplied to movement compensation circuit 464 which shifts the one previous image from frame memory 444 according to the movement vector. This shifted image is added to the output of inverse quantizer 438 by adder 440, and the resultant data is output through post-processing circuit 442.

As explained above, with the use of the method for performing movement compensation by comparing one previous image with a present image, the transmission error detection executed by checking the block address can be used as it is, and the introduction of the movement compensation can reduce the number of quantized bits. Furthermore, the reduction in the number of quantized bits can realize a finer block division and can increase the block addresses accordingly, thus ensuring finer address checking.

As should be understood from the above, this invention can provide an image transmission apparatus, which can apply to transmission lines with different transmission rates and can transfer an image without significant deterioration of an image quality (resolution) particularly at a low transmission rate.

Further, this invention can provide an image transmission apparatus which can always ensure a high differential coding efficiency, irrespective of the degree of change of a image (the level of the difference) in performing an orthogonal transform differential coding.

Furthermore, this invention can provide an image transmission apparatus in which a buffer memory on a decoding side does not overflow or underflow even when the coding speed does not coincide with the decoding speed, thus providing an image without loss of information or deterioration of the image quality.

Moreover, this invention can provide an image transmission apparatus in a differential coding system, which can transmit an original code to refresh a buffer memory on a decoding side for compensation for a transmission error, without the need of additional unit to a transmitting/receiving section and without interrupting the transmission of a difference code.

In addition, this invention can provide an image transmission apparatus in a differential coding system, which can detect a transmission error without the need of additional unit to a transmitting/receiving section and without affixing an additional signal to a transmission signal.

What is claimed is:

1. An image transmission apparatus comprising a coder for quantizing a difference between an image signal and a predetermined signal, a decoder for inversely-quantizing a transmitted signal, and a transmission path for transmitting a quantized signal from the coder to decoder, wherein said coder comprising:

subtraction means for generating a first difference indicating a difference between an image signal of a present frame and an image signal of one previous frame, a second difference indicating a difference between an image signal of a given portion of the present frame and an image signal of another portion of the present frame, a third difference indicating a difference between an image signal of the present frame and an accumulated image signal of all previous frames, and a fourth difference signal indicating a difference between an image signal of the present frame and a predetermined image signal; and first quantization means, coupled to said subtraction means, for outputting a quantization signal of a minimum one of said first to fourth differences.

2. An image transmission apparatus according to claim 1, wherein said image signal is an orthogonal transform signal, said first difference is a difference between an orthogonal transform signal of the present frame and an orthogonal transform signal of one previous frame, said second difference is a difference between an orthogonal transform signal of the given portion of the present frame and an orthogonal transform signal of said another portion of the present frame, said third difference is a difference between said orthogonal transform signal of the present frame and an orthogonal transform signal of said accumulated image signal, and said fourth difference is a difference between said orthogonal transform signal of the present frame and an orthogonal transform signal of said predetermined image signal.

3. An image transmission apparatus according to claim 1, wherein said first quantization means comprises:
means for outputting an orthogonal transform signal of said quantization signal;
means for determining whether or not said quantization signal has a level higher than a predetermined value; and
selection means for outputting said orthogonal transform signal of said quantization signal when said level of said quantization signal is determined by said decision means to be higher than said predetermined value and outputting said quantization signal otherwise.

4. An image transmission apparatus according to claim 1, wherein said subtraction means comprises:
inverse quantization means, coupled to an output of said first quantization means, for inversely-quantizing said quantization signal to attain said minimum one of said first to fourth differences;
a frame memory for storing an output of said inverse quantization means;
a first subtractor for generating a first difference representing a difference between a given portion of the image signal of the present frame and a corresponding part of a image signal stored in said frame memory;
a memory for storing an image signal of another portion of said output of said inverse quantization means which is different from said given portion;
a second subtractor for generating a second difference representing a difference between the image signal of the present frame and an image signal stored in said memory;
nonlinear calculation means for receiving an output of said frame memory and linearly outputting a signal proportional to the output of said frame memory when said output of said frame memory is within a predetermined level range and outputting a signal lower in level than said output of said frame memory when said output thereof is not within the predetermined level range;

a background frame memory for storing an output of said nonlinear calculation means;
a third subtractor for generating a third difference representing a difference between the image signal of the present frame and an image signal stored in said background frame memory;
means for generating a specific level; and
a fourth subtractor for generating a fourth difference between the input image signal of the present frame and said specific level.

5. An image transmission apparatus according to claim 1, further comprising:
means for quantizing an image signal in one frame for each block and transmitting said quantized image signal together with a block address affixed thereto in accordance with a transmission order of blocks in said one frame; and
means for receiving said transmitted quantized image signal and block address and determining whether or not said block address is a greatest amount block addresses of one frame or smaller than a block address of a previous block, thereby detecting a transmission error.

6. An image transmission apparatus according to claim 1, further comprising:
second quantization means for quantizing the image signal of the present frame; and
transmission means for selectively transmitting outputs of said first and second quantization means.

7. An image transmission apparatus according to claim 5, wherein said transmission means transmits said output of said second quantization means once per frame and transmit said output of said first quantization means otherwise.

8. An image transmission apparatus according to claim 1, wherein said coder comprises:
a buffer memory for storing a transmitted coded image signal;
decoding means for decoding an output of said buffer memory; and
control means for detecting an amount of data stored in said buffer memory, stopping an operation of said decoding means when said amount of data stored in said buffer memory is below a predetermined value, and increasing a decoding speed of said decoding means otherwise.

9. An image transmission apparatus according to claim 8, wherein said control means detects said amount of data stored in said buffer memory based on a difference between a write address and a read address of said buffer memory, and causing a voltage-controlled oscillator, whose oscillation frequency changes with said detected amount of data stored in said buffer memory to control said decoding speed of said decoding means.

10. An image transmission apparatus comprising a coder for quantizing an image signal, a decoder for inversely-quantizing a transmitted signal, and a transmission path for transmitting a quantized signal from the coder to decoder, wherein said coder comprises:
pixel sampling means for reducing a number of pixels in a single frame of an image signal;
frame sampling means for reducing a number of frames of an image signal per unit time;
quantization means for quantizing an image signal put through said pixel sampling means and said frame sampling means; and
control means for controlling a reduction rate of said pixel sampling means and said frame sampling means in accordance with a transmission rate of said transmission path in such a manner that both the number of pixels and the number of frames are reduced in accordance with said transmission rate when said transmission rate is higher than a predetermined rate, and the number of pixels is maintained fixed and only the number of frames is reduced in accordance with the transmission rate when said transmission rate is not higher than the predetermined rate.

11. An image transmission apparatus according to claim 10, wherein said pixel sampling means comprises means for sampling said image signal for a predetermined number of pixels; and wherein said frame sampling means comprises means for sampling said image signal for a predetermined number of frames.

12. An image transmission apparatus according to claim 10, wherein said quantization means comprises:
 a transformer for orthogonally-transforming the image signal put through said pixel sampling mean and said frame sampling means; and
 a quantizer for quantizing those signals output from said transformer, ranging from a lowest frequency component to a predetermined frequency component which corresponds to a transmission rate, to have a number of bits which corresponds to the transmission rate.

13. An image transmission apparatus according to claim 10, further comprising:
 a buffer memory, coupled to said quantization means and having a present maximum capacity which varies corresponding to a transmission rate.

14. An image transmission apparatus according to claim 10, wherein said quantization means comprises:
 a transformer for orthogonally-transforming the image signal put through said pixel sampling means and said frame sampling means;
 subtraction means for generating a difference between an output of said transformer having a timing of a present frame and an output of said transformer having a timing of a previous frame; and
 a quantizer for quantizing those signals output from said subtraction means, ranging from a lowest frequency component to a predetermined frequency component which corresponds to a transmission rate, to have a number of bits which corresponds to the transmission rate.

15. An image transmission apparatus according to claim 10, wherein said quantization means comprises:
 compensation means for performing a movement compensation on the image signal put through said pixel sampling means and said frame sampling means; and
 a quantizer for quantizing those signals output from said compensation means, ranging from a lowest frequency component to a predetermined frequency component which corresponds to a transmission rate, to have a number of bits which corresponds to the transmission rate.

16. An apparatus for transmitting an image signal to a transmission path having a predetermined transmission rate, comprising:
 means for reducing a spatial resolution of the image signal; and
 means for controlling the reduction rate of said reducing means in accordance with the transmission rate such that the spatial resolution of transmitted image is nonlinear with respect to the transmission rate.

17. An apparatus according to claim 16, wherein said reducing means comprises means for sampling a predetermined number of pixels in a signal frame of the image, the predetermined number corresponding to the transmission rate.

18. An apparatus according to claim 16, wherein said reducing means further comprises means for cosine transforming the image signal and means for selecting only a component of the cosine transformed image signal which ranges from a DC component to a high frequency component corresponding to said transmission rate.

19. An image transmission apparatus for transmitting an image signal to a predetermined transmission path having a predetermined transmission rate, comprising:
 quantizing means for quantizing an image signal;
 buffer memory means, having a variable capacity, for storing an output for said quantizing means each time each quantizing means produces an output and for outputting the stored signal at a cycle corresponding to the transmission rate of said transmission path; and
 means for determining a capacity of said buffer memory means in accordance with the transmission rate of said transmission path.

20. An apparatus for receiving a transmission image, comprising:
 a buffer memory for storing a coded image signal which is transmitted;
 decoding means for decoding an output of the buffer memory;
 detecting means for detecting an amount of data stored in said buffer memory; and
 control means for stopping an operation of the decoding means when the detected amount is less than a predetermined amount and increasing a decode speed of said decoding means when the detected amount exceeds said predetermined amount.

21. An apparatus according to claim 20, in which said control means detects the amount by detecting a difference between a write address and a read address of said buffer memory and controls a decode speed of said decoding means by a voltage controlled oscillator which varies an oscillation frequency in accordance with the detected amount.

22. An image transmission apparatus comprising:
 means for quantizing an image signal corresponding to one frame having blocks for every block and for transmitting the image signal with a block address attached thereto, the block address corresponding to a transmission sequence of blocks in one frame;
 means for receiving the quantized image signal and block address, for detecting a transmission error by detecting whether or not the received block address is greater than a maximum value of the block address or whether or not said received block address is smaller than the block address of a previous block in one frame; and
 means for inversely quantizing the quantized image signal and for interrupting the inverse quantization when a transmission error is detected.

* * * * *